(12) United States Patent
Yang et al.

(10) Patent No.: US 8,109,411 B2
(45) Date of Patent: Feb. 7, 2012

(54) ELECTRIC SOAP DISPENSER

(75) Inventors: Frank Yang, Rancho Palos Verdes, CA (US); Joseph Sandor, Santa Ana Heights, CA (US); Orlando Cardenas, Laguna Niguel, CA (US)

(73) Assignee: simplehuman, LLC, Torrance, CA (US)

( * ) Notice: Subject to any disclaimer, the term of this patent is extended or adjusted under 35 U.S.C. 154(b) by 0 days.

(21) Appl. No.: 11/839,426

(22) Filed: Aug. 15, 2007

(65) Prior Publication Data
US 2008/0185398 A1 Aug. 7, 2008

Related U.S. Application Data

(63) Continuation-in-part of application No. 11/670,380, filed on Feb. 1, 2007.

(51) Int. Cl.
*B67D 5/08* (2006.01)

(52) U.S. Cl. ....... 222/52; 222/333; 222/113; 222/146.2; 222/496; 222/63

(58) Field of Classification Search ............ 222/52, 222/63, 251, 333, 638, 146.2, 146.5, 491, 222/495, 496, 113, 192; 362/276, 800, 253
See application file for complete search history.

(56) References Cited

U.S. PATENT DOCUMENTS

| | | | |
|---|---|---|---|
| 2,697,446 A * | 12/1954 | Harrington | .............. 137/509 |
| 3,023,922 A | 3/1962 | Arrington et al. | |
| 3,149,754 A | 9/1964 | Wolf et al. | |
| 3,220,954 A | 11/1965 | Malbe | |
| 4,056,050 A | 11/1977 | Brown | |
| 4,217,993 A | 8/1980 | Jess et al. | |
| 4,498,843 A | 2/1985 | Schneider et al. | |
| 4,722,372 A | 2/1988 | Hoffman et al. | |
| 4,915,347 A | 4/1990 | Iqbal et al. | |
| 4,938,384 A | 7/1990 | Pilolla | |
| 4,967,935 A | 11/1990 | Celest | |
| 5,028,328 A | 7/1991 | Long | |
| 5,186,360 A | 2/1993 | Mease et al. | |

(Continued)

FOREIGN PATENT DOCUMENTS

JP    D1117308    8/2001

(Continued)

OTHER PUBLICATIONS

International Search Report for Taiwanese Patent Application No. 096304216, Filed Aug. 1, 2007 with English translation dated Apr. 29, 2008, in two pages.

(Continued)

*Primary Examiner* — Kevin P Shaver
*Assistant Examiner* — Donnell Long
(74) *Attorney, Agent, or Firm* — Knobbe, Martens, Olson & Bear LLP

(57) ABSTRACT

An electric soap dispenser that includes sensors for detecting the presence of an object. The dispenser can be configured to dispense an amount of liquid soap, for example, upon detecting the presence of an object. The dispenser can include various features for enhancing the performance thereof. For example, the dispenser can include an additional button for manual operation of the pump. Additionally, the dispenser can detect the voltage of a power supply and compensate for a drop in voltage of the power supply so as to produce more uniform dispensations of the liquid product. Additionally, the dispenser can include a valve at its discharge end to prevent drips.

18 Claims, 17 Drawing Sheets

U.S. PATENT DOCUMENTS

| | | | |
|---|---|---|---|
| 5,271,528 A | 12/1993 | Chien | |
| 5,305,916 A * | 4/1994 | Suzuki et al. | 222/52 |
| 5,472,719 A | 12/1995 | Favre | |
| 5,477,984 A | 12/1995 | Sayama et al. | |
| 5,771,925 A | 6/1998 | Lewandowski | |
| 5,823,390 A | 10/1998 | Muderlak et al. | |
| 5,829,636 A * | 11/1998 | Vuong et al. | 222/63 |
| 5,836,482 A | 11/1998 | Ophardt et al. | |
| 5,960,991 A | 10/1999 | Ophardt | |
| D416,154 S | 11/1999 | Diehl | |
| 6,021,705 A | 2/2000 | Dijs | |
| 6,021,960 A * | 2/2000 | Kehat | 239/289 |
| 6,036,056 A | 3/2000 | Lee et al. | |
| D426,093 S | 6/2000 | Cayouette | |
| 6,126,290 A * | 10/2000 | Veigel | 362/96 |
| D438,041 S | 2/2001 | Huang | |
| 6,209,752 B1 | 4/2001 | Mitchell et al. | |
| RE37,173 E | 5/2001 | Jefferson, Jr. et al. | |
| 6,279,460 B1 | 8/2001 | Pope | |
| 6,279,777 B1 | 8/2001 | Goodin et al. | |
| 6,311,868 B1 * | 11/2001 | Krietemeier et al. | 222/1 |
| 6,375,038 B1 | 4/2002 | Daansen et al. | |
| 6,443,328 B1 | 9/2002 | Fehl et al. | |
| 6,444,956 B1 * | 9/2002 | Witcher et al. | 219/429 |
| 6,557,584 B1 | 5/2003 | Lucas et al. | |
| 6,594,105 B1 | 7/2003 | Brittner | |
| D483,974 S | 12/2003 | Reed | |
| 6,698,616 B2 * | 3/2004 | Hidle et al. | 222/1 |
| 6,722,265 B2 | 4/2004 | Priley | |
| D490,262 S | 5/2004 | Graves et al. | |
| 6,748,850 B1 | 6/2004 | Kraan | |
| 6,777,007 B2 | 8/2004 | Cai | |
| 6,805,042 B2 | 10/2004 | Mordini et al. | |
| 6,832,542 B2 | 12/2004 | Hu et al. | |
| 6,892,899 B2 * | 5/2005 | Minard et al. | 222/1 |
| 6,929,150 B2 | 8/2005 | Muderlak et al. | |
| 7,008,073 B2 * | 3/2006 | Stuhlmacher, II | 362/96 |
| D530,954 S | 10/2006 | Snell | |
| D531,440 S | 11/2006 | Lo | |
| D534,753 S | 1/2007 | Christianson | |
| 7,178,746 B2 * | 2/2007 | Gross | 239/552 |
| D554,412 S | 11/2007 | Yang et al. | |
| 7,296,765 B2 | 11/2007 | Rodrian | |
| D564,273 S | 3/2008 | Yang et al. | |
| 7,337,635 B2 * | 3/2008 | Cerruti et al. | 68/17 R |
| D565,878 S | 4/2008 | Krus | |
| 7,354,015 B2 | 4/2008 | Byrd et al. | |
| D581,193 S | 11/2008 | Ghiorghie | |
| D582,187 S | 12/2008 | Yang et al. | |
| 7,540,397 B2 * | 6/2009 | Muderlak et al. | 222/400.5 |
| D608,578 S | 1/2010 | Yang et al. | |
| 2002/0179643 A1 * | 12/2002 | Knight et al. | 222/146.2 |
| 2004/0032749 A1 * | 2/2004 | Schindler et al. | 362/555 |
| 2004/0050875 A1 * | 3/2004 | Kobayashi | 222/333 |
| 2004/0103792 A1 | 6/2004 | Cirigliano et al. | |
| 2004/0134924 A1 | 7/2004 | Hansen et al. | |
| 2004/0226962 A1 | 11/2004 | Mazursky et al. | |
| 2006/0067546 A1 | 3/2006 | Lewis et al. | |
| 2006/0173576 A1 | 8/2006 | Goerg et al. | |
| 2006/0243740 A1 | 11/2006 | Reynolds et al. | |
| 2007/0000941 A1 * | 1/2007 | Hadden et al. | 222/52 |
| 2007/0158359 A1 | 7/2007 | Rodrian | |
| 2008/0185396 A1 | 8/2008 | Yang et al. | |
| 2008/0185399 A1 | 8/2008 | Yang et al. | |
| 2011/0114669 A1 | 5/2011 | Yang et al. | |

FOREIGN PATENT DOCUMENTS

| | | |
|---|---|---|
| JP | D1266683 | 4/2006 |
| KR | 3002845520000 | 10/2001 |
| WO | WO 2008/095187 | 8/2008 |

OTHER PUBLICATIONS

International Search Report for PCT Application No. PCT/US2008/052854, dated Jun. 24, 2008.

The Sharper Image Soap Genie Sl335, in 8 pages.

Supplementary European Search Report for European Application No. EP 08714179, dated Apr. 27, 2011, in 7 pages.

* cited by examiner

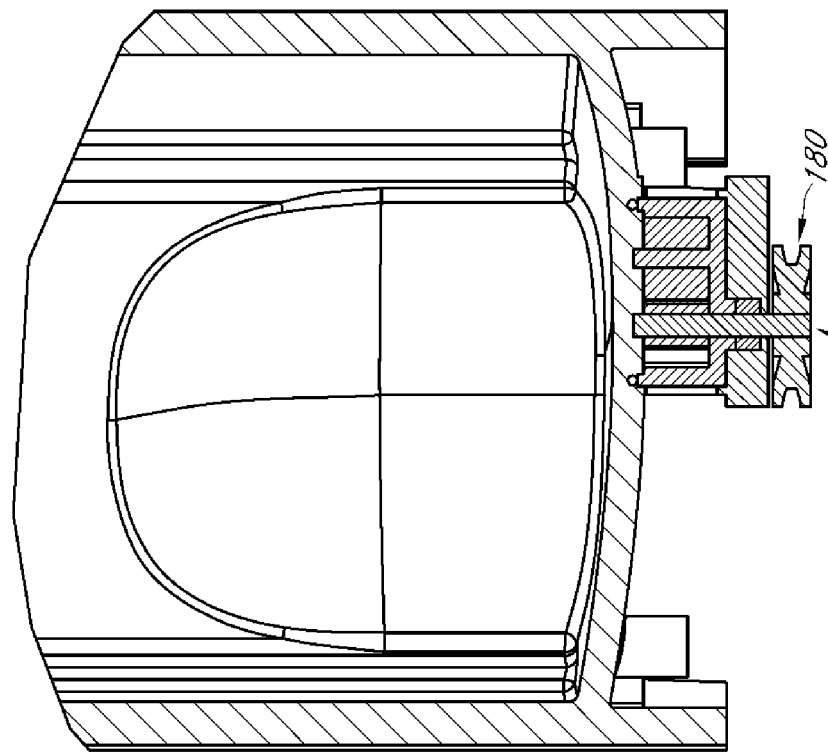
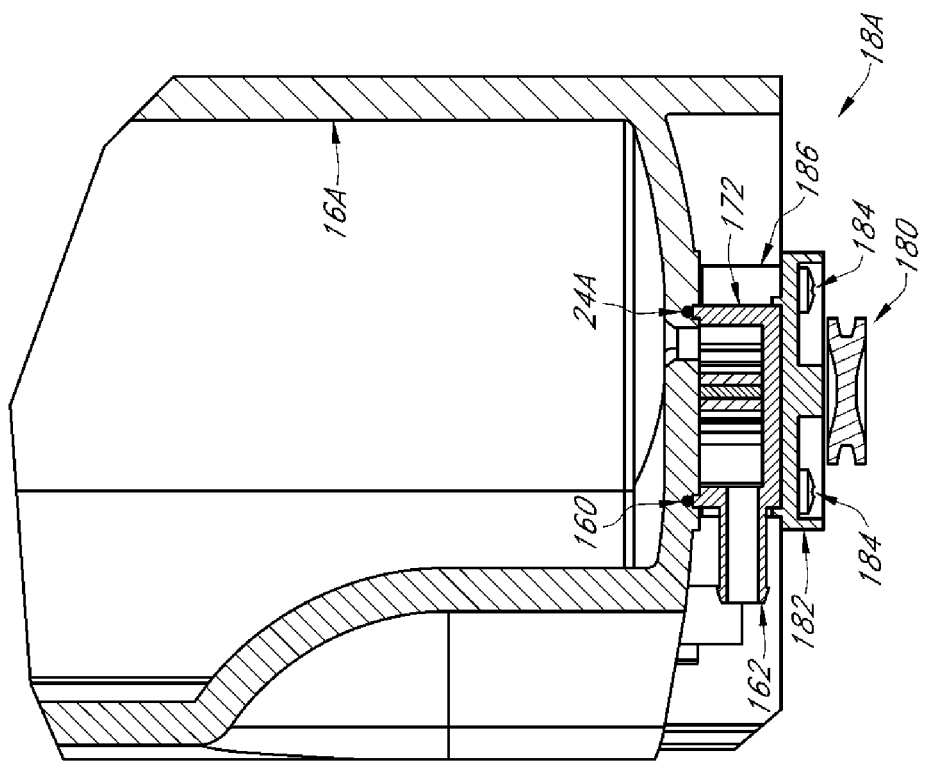

ELECTRIC SOAP DISPENSER

This is a continuation in part of U.S. patent application Ser. No. 11/670,380 filed Feb. 1, 2007, the entire contents of which is hereby expressly incorporated by reference.

BACKGROUND OF THE INVENTIONS

1. Field of the Inventions

The present inventions relate to soap dispensers, and more particularly, electric soap dispensers.

2. Description of the Related Art

Users of modern public washroom facilities increasingly desire that each of the fixtures in the washroom operate automatically without being touched by the user's hand. This is important in view of increased user awareness of the degree to which germs and bacteria may be transmitted from one person to another in a public washroom environment. Today, it is not uncommon to find public washrooms with automatic, hands-free operated toilet and urinal units, hand washing faucets, soap dispensers, hand dryers, and door opening mechanisms. This automation allows the user to avoid touching any of the fixtures in the facility, and therefore lessens the opportunity for the transmission of disease-carrying germs or bacteria resulting from manual contact with the fixtures in the washroom.

It is desirable that, with regard to automatic soap dispensers, that such a soap dispenser delivers uniform measure doses of fluid soap to users upon each actuation of the device. Several automatically operated washroom fluid soap dispensers have been proposed in patents such as, for example, U.S. Pat. No. 6,929,150 (Muderlak, et al.), U.S. Pat. No. 4,967,935 (Celest), U.S. Pat. No. 4,938,384 (Pilolla), as well as others.

SUMMARY OF THE INVENTIONS

An aspect of at least one of the embodiments disclosed herein includes the realization that in certain environments of use, such as residential use, the user of an electric soap dispenser may wish to discharge a more continuous stream of soap than that normally dispensed by an electric soap dispenser. For example, if an owner or user of such a dispenser wishes to create a sink full of soapy water for washing dishes or to discharge a significant amount of soap to clean counters or other surfaces or devices, it would be more convenient for the user if they could operate the soap dispenser in a mode in which more than a single small amount of soap is discharged.

Thus, in accordance with at least one embodiment, an electric soap dispenser can comprise a housing, a power supply supported by the housing, and a reservoir configured to store liquid soap, the reservoir being supported by the housing. A pump can be disposed in the housing, the pump having an inlet connected to the outlet of the reservoir, and an electric motor can be supported by the housing and can drive the pump, the electric motor being powered by the power supply. A soap discharge nozzle can be connected to the pump with a soap conduit and disposed in an upper portion of the housing. A trigger sensor can be configured to detect the presence of an object. An electronic control unit can be connected to the trigger sensor and to the electric motor, the electronic control unit can also be configured to actuate the electric motor upon receiving a signal from the trigger sensor. A button can also be disposed on an upper portion of the housing, the button being connected to the electronic control unit. The electronic control unit can be further configured to actuate the electric motor when the button is activated.

In accordance with at least another embodiment, an electric soap dispenser can comprise a housing, a power supply supported by the housing, and a reservoir configured to store liquid soap, the reservoir being supported by the housing. A pump can be disposed in the housing, the pump having an inlet connected to the outlet of the reservoir. An electric motor can be supported by the housing and driving the pump, the electric motor being powered by the power supply. A soap discharge nozzle can also be connected to the pump with a soap conduit and disposed in an upper portion of the housing. A trigger sensor configured to detect the presence of an object. An electronic control unit can also be connected to the trigger sensor and to the electric motor, the electronic control unit being configured to actuate the electric motor upon receiving a signal from the trigger sensor. Additionally, the dispenser can include means for allowing a user to operate the pump without activating the trigger sensor.

Another aspect of at least one of the embodiments disclosed herein includes the realization that electric soap dispensers occasionally need to be primed because typically, liquid type pumps normally must be filled with liquid before the pump can actually pump liquid. Thus, if the pump dries out and contains only air, the pump does not operate until the pump has been pumped. Certain previous designs for electric soap dispensers have included additional features for priming the pump, such as those described in U.S. Pat. No. 6,929,150 (Muderlak et al.).

Another aspect of at least one of the embodiments disclosed herein includes the realization that with the recent increased availability of high speed switching and other devices that have the ability to switch between on and off states at a high speed, further power savings can be achieved by using sensors which are operated only briefly yet at a sufficiently high frequency so as to avoid any unacceptably long delays perceptible by the operator.

Another aspect of at least one of the embodiments disclosed herein includes the realization that the useful life of a battery for a battery powered dispenser can be extended by modulating the power draw from the battery over time. For example, known battery powered devices often draw power from the battery in the same manner for each actuation over the entire life of the battery. Thus, as the battery power drains, the device operates more slowly, for example. However, by changing the manner in which power is drawn from the batteries as the power from the battery drains over time, the associated device can provide consistent performance over a greater period of time, even as the battery power drains. For example, initially, when the battery is fully charged, less than the full power of the battery is applied or is drawn for operating the pump. Then, over time, as the battery power drops, greater effective loads are put on the battery to compensate for its reduced charge. As a result, the operation of the pump is more uniform over a longer period of time. Additionally, the full charge of the battery is used more effectively.

Another aspect of at least one of the embodiments disclosed herein includes the realization that in some environments, such as the residential or retail use, it is desirable to be able to adjust the amount of soap discharged each discharge cycle. For example, owners of such soap dispensers who have small children might prefer to adjust the soap dispenser to issue the smallest amount of soap possible each cycle. In this way, it is less likely that a child who plays with the soap dispenser will cause the soap dispenser to run out of soap too frequently. On the other hand, some users, for example, users with larger hands may wish to have to more soap dispensed each cycle so that they have an adequate amount of soap to wash their hands from a single discharge of soap.

Another aspect of at least one of the embodiments disclosed herein includes the realization that dripping, which is a problem for many manual and automatic soap dispensers, can be prevented where the dispenser uses a reversible pump. For example, such a soap dispenser using a reversal pump can reverse the actuation of a pump at the end of each dispensing cycle, so as to draw the soap in a reverse direction through the soap discharge nozzle and/or conduit attached to it, to thereby reduce or eliminate dripping.

Another aspect of at least one of the embodiments disclosed herein includes the realization that the power consumption of the device can be lowered by adjusting or manipulating the actuation of a sensor used to trigger dispensation. For example, some modern sensors can be activated at high frequencies, due to the availability of newer, lower power sensors that are capable of switching between on and off states at a very high frequency. Thus, using such a sensor, the associated control electronics can be configured to activate the sensors at an activation period or frequency, and can also be configured to further specify a very brief activation duration. By making the activation duration significantly less than the activation period or frequency, the total amount of time that the sensor is activated can be quite low, while the sensor is activated sufficiently often that a user does not perceive an unacceptable delay in response from the device. For example, some kinds of sensors can be activated at a frequency of about four times per second. Additionally, these sensors can be activated for a duration of about 50 microseconds. Thus, as such, the sensor is off much of the time. However, it is activated four times per second, or in other words, once every quarter of a second. As such, a user would experience only a one quarter of a second maximum delay from between the time of moving a part of their body into a position to trigger the sensor and the sensor detecting the presence of that portion of their body.

Another aspect of at least one of the embodiments disclosed herein includes the realization that although automatic soap dispensers that include an indicator triggered off of a timer for reminding users how long they should wash their hands for, would prefer to occasionally deactivate this indicator. For example, such an automatic soap dispenser can include a user input device configured to allow a user to cancel an indicator that is designed to emit a tone at a predetermined amount of time after soap has been dispensed.

A further aspect of at least one of the embodiments disclosed herein includes the realization that significant savings can be achieved by using a single piece or member as both a gasket and a support leg or foot for a device. For example, in the context of a soap dispenser, a pliable or resilient member can be disposed around at least one opening disposed in the bottom of the dispenser. A cover can be used to cover the opening into the cavity and the gasket can be used to provide a seal around the opening between the cover and the mouth of the opening. Additionally, the gasket can be shaped to extend downwardly from the other adjacent portions of the housing so as to form a support foot or leg for the device. As such, the single member forming the gasket and the foot can be made from one piece and thereby reduce the cost of the overall device. A further advantage is achieved where the lower surface of the gasket extends substantially uniformly around the entire opening. As such, the gasket can help form a wall or a seal around the entire periphery of the footprint of the device and therefore prevent water, soap scum, or other liquids or materials from collecting under the device, thereby keeping the portion of a support surface directly under the device cleaner.

Another aspect of at least one of the embodiments disclosed herein includes the realization that an automatic soap dispenser can, particularly in the retail environment, be left inoperable for a significant amount of time, for example, when the owner goes on vacation. As such, the liquid soap in the device, and in particular in the discharge nozzle, can dry out and form a clog. Further, additional advantages can be provided by configuring the soap dispenser device to operate in a clog clearing mode in which a soap pump is operated in forward and reverse modes cyclically which can clear a clog. Additionally, an owner or operator can optionally hold a cup of hot water or other liquid at the discharge nozzle so that this hot liquid can be drawn into and pushed out of the discharge nozzle repeatedly, thereby helping to unclog the nozzle.

Another aspect of at lest one of the inventions disclosed herein includes the realization that if a valve is included in a liquid soap dispenser, liquid soap can dry out and become entangled with a spring of the valve assembly and thus clog the outlet. Thus, by mounting the biasing member of the valve in a position such that it is not in the flow of liquid soap, there is less likelihood that the outlet will become clogged.

Thus in accordance with another embodiment, an electric soap dispenser can comprise a housing, a power supply supported by the housing, and a reservoir configured to store liquid soap. A pump can be disposed in the housing, the pump having an inlet connected to the outlet of the reservoir. An electric motor can be supported by the housing and driving the pump, the electric motor being powered by the power supply. A soap outlet can be connected to the pump and disposed in an upper portion of the housing. A trigger sensor can be configured to detect the presence of an object. An electronic control unit can be connected to the trigger sensor and to the electric motor, the electronic control unit configured to actuate the electric motor upon receiving a signal from the trigger sensor. The dispenser can also include a valve and a biasing member configured to close the valve when the pump is not operating to reduce a flow of liquid soap from leaking out of the soap outlet when the pump is not operating, the biasing member being positioned outside the flow of soap through the outlet.

In accordance with yet another embodiment, an electric soap dispenser can comprise a housing, a power supply supported by the housing, a reservoir configured to store liquid soap, and a pump disposed in the housing, the pump having an inlet connected to the outlet of the reservoir. An electric motor can be supported by the housing and driving the pump, the electric motor being powered by the power supply. An electronic control unit can be connected to the electric motor, the electronic control unit configured to actuate the electric motor. Additionally, a soap outlet assembly can be connected to the pump, the soap outlet assembly comprising a soap outlet aperture, a light guide member and a light source, the light guide member being configured to guide light from the light source to an exterior of the housing.

BRIEF DESCRIPTION OF THE DRAWINGS

These and other features, aspects and advantages of the inventions disclosed herein are described below with reference to the drawings of a preferred embodiment, which is intended to illustrate and not to limit the inventions. The drawings comprise the following figures:

FIG. 7 is a sectional view of a liquid soap reservoir of the liquid soap dispenser of FIG. 2, illustrating a portion of the reservoir, a pump body, a pump cover, and a portion of a drive sheave for the pump illustrated in sections;

FIG. 8 is another sectional view of the pump, cover, and pulley illustrated in FIG. 7;

DETAILED DESCRIPTION OF THE PREFERRED EMBODIMENT

Figure 1:
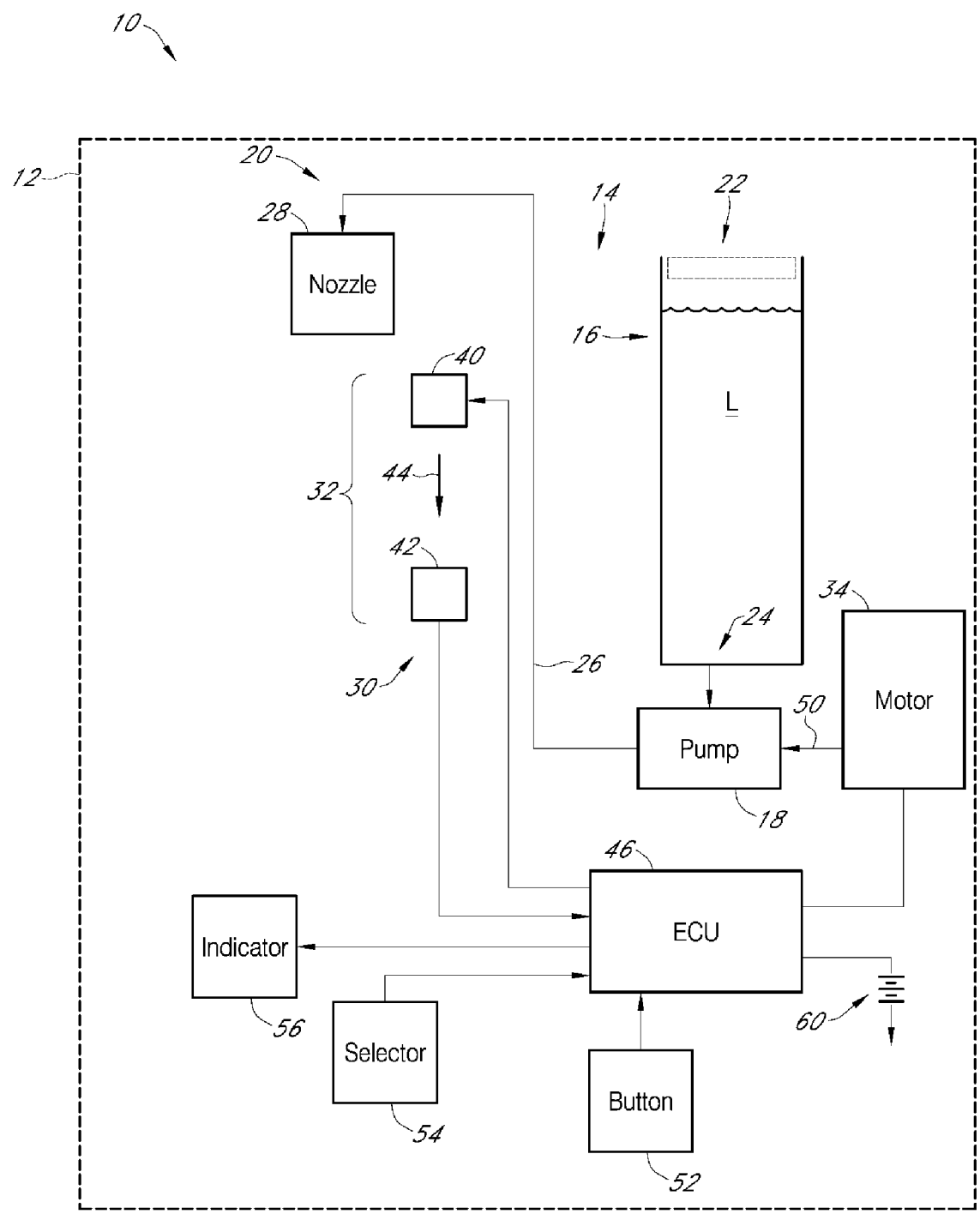
FIG. 1 is a schematic diagram illustrating an automatic liquid soap dispenser in accordance with an embodiment.

FIG. 1 schematically illustrates an embodiment of an electric liquid soap dispenser 10 that can include various features and embodiments of the inventions disclosed herein. The present inventions are disclosed in the context of a liquid soap dispenser 10 because they have particular utility in this context. However, many of the inventions disclosed herein can be used in many other diverse contexts and environments of use. For example, many or all of the inventions disclosed herein can be used in other types of dispensers, battery-powered devices, or even any other electric device. For example, some of the inventions disclosed herein regarding sensor actuation can be used in any type of device that includes sensors that detect the presence of an object or other parameters or characteristics. Those of ordinary skill in the art will recognize, from the description set forth below, many of the other environments of use in which the present inventions can be used, although those environments are not described herein.

With continued reference to FIG. 1, the liquid soap dispenser 10 includes a housing 12. The housing 12 can take any shape.

The dispenser 10 can include a liquid handling system 14. The liquid handling system can include a reservoir 16, a pump 18, and a discharge assembly 20.

The reservoir 16 an be any type of container. In the illustrated embodiment, the reservoir 16 is configured to contain a volume of liquid soap, such as liquid soap for hand washing. In some embodiments, the reservoir 16 can include a lid 22 configured to form a seal at the top of the reservoir for maintaining the liquid soap L within the reservoir 16. Additionally, in some embodiments, the lid 22 can include an air vent (not shown), so as to allow air to enter the reservoir 16 as the level of liquid soap L falls within the reservoir 16.

The reservoir 16 can also include an outlet 24 disposed at a lower end of the reservoir 16. The reservoir 16 can be connected to the pump 18 through the opening 24.

In some embodiments, the pump 18 can be disposed directly below the outlet 24 of the reservoir 16. As such, the pump 18, depending on the type of pump used, can be automatically primed due to the force of gravity drawing liquid soap L into the pump 18 through the opening 24.

The pump 18 can be connected to the discharge system 20 with a conduit 26. Any type or diameter of conduit can be used.

The discharge assembly 20 can include a discharge nozzle 28. Any type of discharge nozzle can be used. For example, the size of the discharge nozzle 26 can be determined to provide the appropriate flow rate and/or resistance against flow of liquid soap L from the pump 18.

In some embodiments, the nozzle 28 can be disposed at a location spaced from the lower portion of the housing 12 so as to make it more convenient for a user to place their hand or other body part under the nozzle 28.

The dispenser 10 can also include a pump actuation system 30. In some embodiments, the pump actuation system can include a sensor device 32 and an actuator 34.

In some embodiments, the sensor device 32 can include a "trip light" or "interrupt" type sensor. For example, as illustrated in FIG. 1, the sensor 32 can include a light emitting portion 40 and a light receiving portion 42. As such, a beam of light 44 can be emitted from the light emitting portion 40 and received by the light receiving portion 42.

The sensor 32 can be configured to emit a trigger signal when the light beam 44 is blocked. For example, if the sensor 32 is activated, and the light emitting portion 40 is activated, but the light receiving portion 42 does not receive the light emitted from the light emitting portion 40, then the sensor 32 can emit a trigger signal. This trigger signal can be used for controlling operation of the motor or actuator 34, described in greater detail below. This type of sensor can provide further advantages.

For example, because the sensor 32 is merely an interrupt-type sensor, it is only triggered when a body is disposed in the path of the beam of light 44. Thus, the sensor 32 is not triggered by movement of a body in the vicinity of the beam 44. Rather, the sensor 32 is triggered only if the light beam 44 is interrupted. To provide further prevention of unintentional triggering of the sensor 32, the sensor 32, including the light emitting portion 40 and the light receiving portion 42, can be recessed in the housing 12.

In addition to these advantages, other advantages can also be provided. For example, the sensor 32 only requires enough power to generate a low power beam of light 44, which may or may not be visible to the human eye, and to power the light receiving portion 42. These types of sensors require far less power than infrared or motion-type sensors. Additionally, the sensor 32 can be operated in a pulsating mode. For example, the light emitting portion 40 can be powered on and off in a cycle such as, for example, but without limitation, for short bursts lasting for any desired period of time (e.g., 0.01 second, 0.1 second, 1 second) at any desired frequency (e.g., once per half second, once per second, once per ten seconds). These different time characteristics can be referred to as an activation period or frequency, which corresponds to the periodic activation of the sensor 32. Thus, an activation frequency of four times per second would be equivalent to an activation period of once per quarter second.

The other aspect of this characteristic can be referred to as an activation duration. Thus, if the sensor 32 is activated for 50 microseconds, 50 microseconds is the activation duration time period. As such, this type of cycling can greatly reduce the power demand for powering the sensor 32. In operation, such cycling does not produce unacceptable results because as long as the user maintains their body parts or other appendage or device in the path of the light beam 44 long enough for a detection signal to be generated, the sensor 32 will be triggered.

The sensor 32 can be connected to a circuit board, an integrated circuit, or other device for triggering the actuator 34. In the illustrated embodiment, the sensor 32 is connected to an electronic control unit ("ECU"). However, other arrangements can also be used.

The ECU 46 can include one or a plurality of circuit boards providing a hard wired feedback control circuits, a processor and memory devices for storing and performing control routines, or any other type of controller. In an exemplary but non-limiting embodiment, the ECU 46 can include an H-bridge transistor/MOSFET hardware configuration which allows for bidirectional drive of an electric motor, and a microcontroller such as Model No. PIC16F685 commercially available and/or other devices.

The actuator 34 can be any type of actuator. For example, but without limitation, the actuator 34 can be an AC or DC electric motor, stepper motor, server motor, solenoid, stepper solenoid, or any other type of actuator. Optionally, the actuator 34 can be connected to the pump 18 with a transmitter device 50. For example, the transmitter device 50 can include any type of gear train or any type of flexible transmitter assembly.

The dispenser 10 can also include a user input device 52. The user input device 52 can be any type of device allowing a user to input a command into the ECU 46. In a non-limiting embodiment, the input device 52 is in the form of a button configured to allow a user to depress the button so as to transmit a command to the ECU 46. For example, the ECU 46 can be configured to actuate the actuator 34 to drive the pump 18 any time the input device 52 is actuated by a user. The ECU 46 can also be configured to provide other functions upon the activation of the input device 52, described in greater detail below.

The dispenser 10 can also include a selector device 54. The selector device 54 can be in any type of configuration allowing the user to input a proportional command to the ECU 46. For example, the selector can have at least two positions, such as a first position and a second position. The position of the input device 54 can be used to control an aspect of the operation of the dispenser 10.

For example, but without limitation, the input device 54 can be used as a means for allowing a user to select different amounts of liquid soap L to be dispensed from the nozzle 28 during each dispensation cycle. As such, when the input device 54 is in a first position, the ECU 46 can operate the actuator 34 to drive the pump 18 to dispense a predetermined amount of liquid soap from the nozzle 28, each time the sensor 32 is triggered. When the input device 54 is in the second position, the ECU 46 can actuate the actuator 34 to dispense a larger amount of liquid soap L from the nozzle 28.

Optionally, in some embodiments, the input device 54 can provide a more continuous range of output values to the ECU 46, or a larger number of steps, corresponding to different volumes of liquid soap L to be dispensed each dispensation cycle performed by the ECU 46. Although the positions of the input device 54 may correspond to different volumes of liquid soap L, the ECU 46 can correlate the different positions of the input device 54 to different duty cycle characteristics or durations of operation of the actuator 34, thereby at times discharging differing or slightly differing volumes of liquid soap L from the nozzle 28.

The dispenser 10 can also include an indicator device 56 configured to issue a visual, aural, or other type of indication to a user of the dispenser 10. For example, in some embodiments, the indicator 56 can include a light and/or an audible tone perceptible to the operator of the dispenser 10. In some embodiments, the ECU 46 can be configured to actuate the indicator 56 to emit a light and/or a tone after a predetermined time period has elapsed after the actuator 34 has been driven to dispense a predetermined amount of liquid soap L from the nozzle 28. As such, the indicator provides a reminder to a user of the dispenser 10 to continue to wash their hands until the indicator has been activated. As such, this predetermined time period can be about 20 seconds, although other amounts of time can also be used. Optionally, the indicator 56 can be used for other purposes as well.

Further advantages can be achieved where the indicator is activated for a predetermined time after the pump has completed a pumping cycle (described in greater detail below with reference to FIG. 4. For example, but without limitation, the ECU 46 can be configured to activate the indicator 56 for 20 seconds after the pump 18 has been operated to discharge an amount of soap from the nozzle 28. As such, the indicator 56 will be activated at the appropriate time for advising the user as to how long they should wash their hands.

In some embodiments, the indicator 56 can be a Light Emitting Diode (LED) type light, and can be powered by the ECU 46 to blink throughout the predetermined time period. Thus, a user can use the length of time during which the indicator 546 blinks as an indication as to how long the user should continue to wash their hands with the soap disposed from the nozzle 28. Other types of indicators and predetermined time periods can also be used.

The dispenser 10 can also include a power supply 60. The power supply 60 can be a battery or can include electronics for accepting AC or DC power.

In operation, the ECU 46 can activate the sensor 32, continuously or periodically, to detect the presence of an object between the light emitting portion 40 and the light receiving portion 42 thereof When an object blocks the light beam 44, the ECU 46 determines that a dispensing cycle should begin. The ECU 46 can then actuate the actuator 34 to drive the pump 18 to thereby dispense liquid soap L from the nozzle 28.

As noted above, in some embodiments, the ECU 46 can vary the amount of liquid soap L dispensed from the nozzle 28 for each dispensation cycle, depending on a position of the selector 54. Thus, for example, the dispenser 10 can be configured to discharge a first volume of liquid soap L from the nozzle 28 when the selector is in a first position, and to discharge a second different amount of liquid soap L when the selector 54 is in a second position.

Optionally, as noted above, the indicator 56 can be activated, by the ECU 46, after a predetermined amount of time has elapsed after each dispensation cycle. Further, the ECU 46 can be configured to cancel or prevent the indicator 56 from being activated if the button 52 has been actuated in accordance with a predetermined pattern. For example, but without limitation, the ECU 46 can be configured to cancel the activation of the indicator 56 if the button 52 has been pressed twice quickly. However, any pattern of operation of the button 52 can also be used as the command for canceling the indicator 56. Additionally, the dispenser 10 can include other input devices for allowing a user to cancel the indicator 56.

Optionally, the ECU 46 can be configured to continuously operate the actuator 34 or to activate the actuator 34 for a maximum predetermined time when the button 52 is depressed. As such, this allows an operator of the dispenser 10 to manually operate the dispenser to continuously discharge or discharge larger amounts of liquid soap L when desired. For example, if a user of the dispenser 10 wishes to fill a sink full of soapy water for washing dishes, the user can simply push the button 52 and dispense a larger amount of soap that would normally be used for washing one's hands. However, other configurations can also be used.

Figure 2:
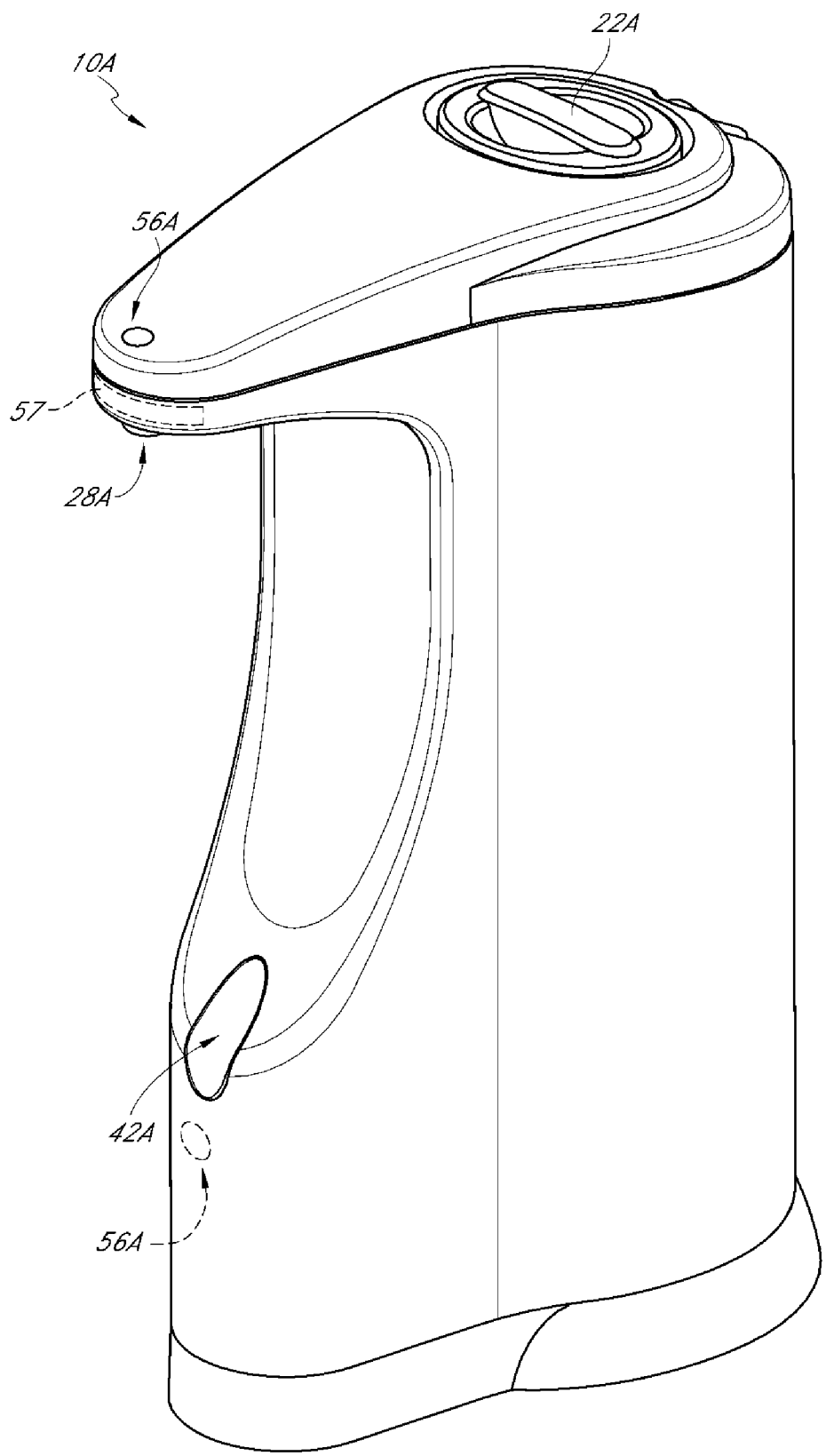
FIG. 2 is a front, top, and left side perspective view of a modification of the automatic liquid soap dispenser of FIG. 1.
Figure 3:
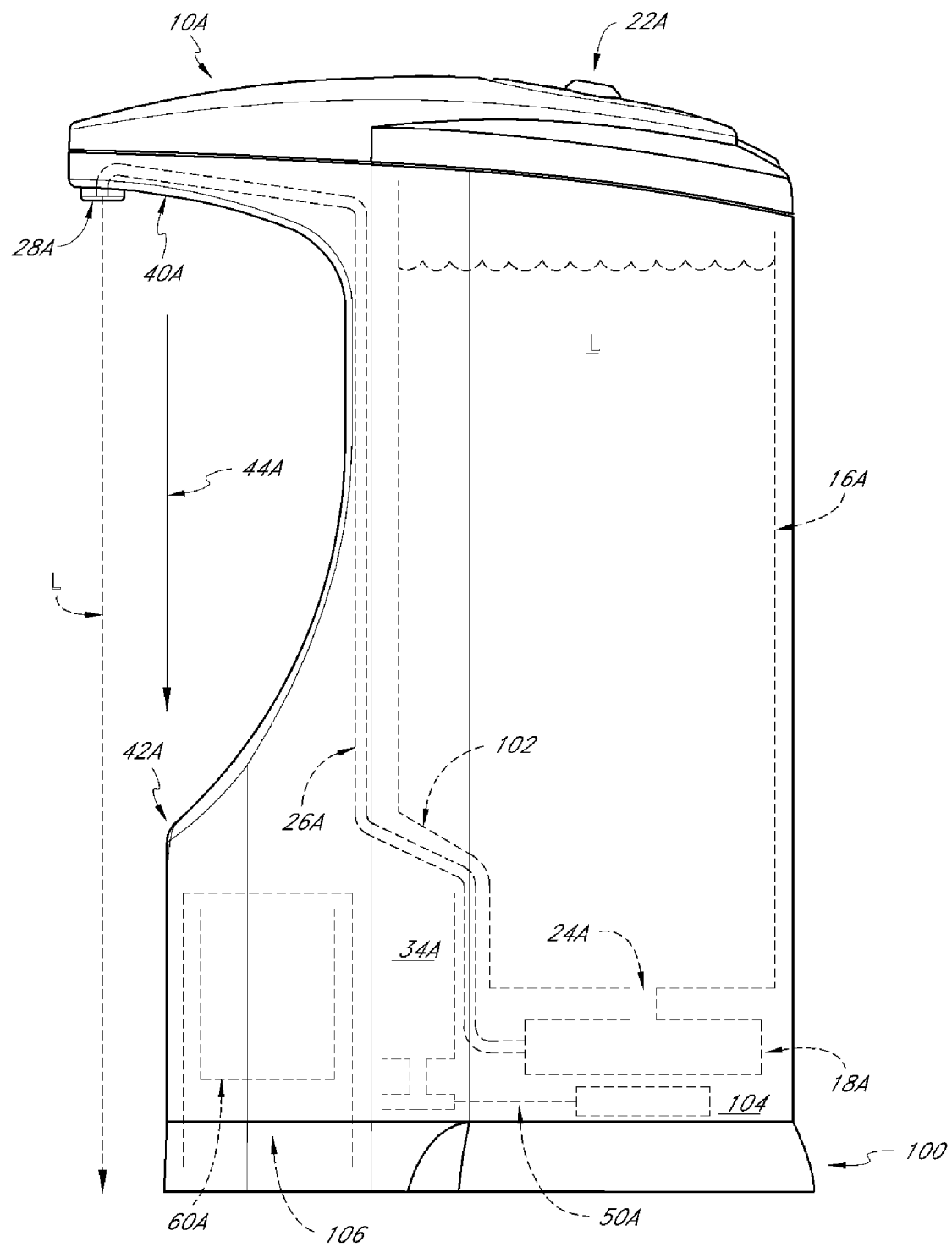
FIG. 3 is a left side elevational view of the liquid soap dispenser of FIG. 2.

FIGS. 2 and 3 illustrate a modification of the dispenser 10, identified generally by the reference numeral 10A. Some of the components of the dispenser 10A can be the same, similar, or identical to the corresponding components of the dispenser 10 illustrated in FIG. 1. These corresponding components are identified with the same reference numeral, except that an "A" has been added thereto.

As shown in FIGS. 1 and 3, the lower end 100 of the dispenser 10A is designed to support the housing 12A on a generally flat surface, such as those normally found on a countertop in a bathroom or a kitchen. In some embodiments, the nozzle 28 can be disposed in a manner such that the nozzle 28A extends outwardly from the periphery defined by the lower portion 100. As such, if a user misses soap dispensed from the nozzle 28A, and the soap L falls, it will not strike on any portion of the housing 12A. This helps prevent the dispenser 10A from becoming soiled from dripping soap L.

In some embodiments the indicator 56A, which can be a visual indicator such as an LED light, can be positioned on the outer housing 12A, above the nozzle 28A. As such, the indicator 56A can be easily seen by an operator standing over the pump. Additionally, in some embodiments, the visual type indicator 56A can be disposed on a lower portion of the housing (illustrated in phantom line). However, the indicator 56A can also be positioned in other locations. For example, the indicator can have a more rectangular shape, an embodiment of which is identified by the reference numeral 57 and illustrated in phantom line, described in greater detail below, with reference to FIG. 13.

As shown in FIG. 3, the reservoir 16A can be disposed within the housing 12A. The pump 18A can be disposed beneath the reservoir 16A such that the outlet 24A of the reservoir 16A feeds into the pump 18A. As such, as noted above, this helps the pump 18A to achieve a self-priming state due to the force of gravity drawing liquid soap L through the outlet 24A into the pump 18A.

In some embodiments, the reservoir 16A can include a recess 102. As such, the actuator 34A can be disposed somewhat nested with the reservoir 16A. This provides for a more compact arrangement and allows the reservoir 16A to be as large as possible.

In some embodiments, the housing 12A can define a pump and motor chamber 104 and a battery chamber 106. The pump 18A and actuator 34A can be disposed within the pump and motor chamber 104 and the power supply 60A can be disposed in the battery chamber 106. In some embodiments, the chambers 104, 106 can be defined by inner walls of the housing 12A and/or additional walls (not shown). However, other configurations can also be used.

Figure 4:
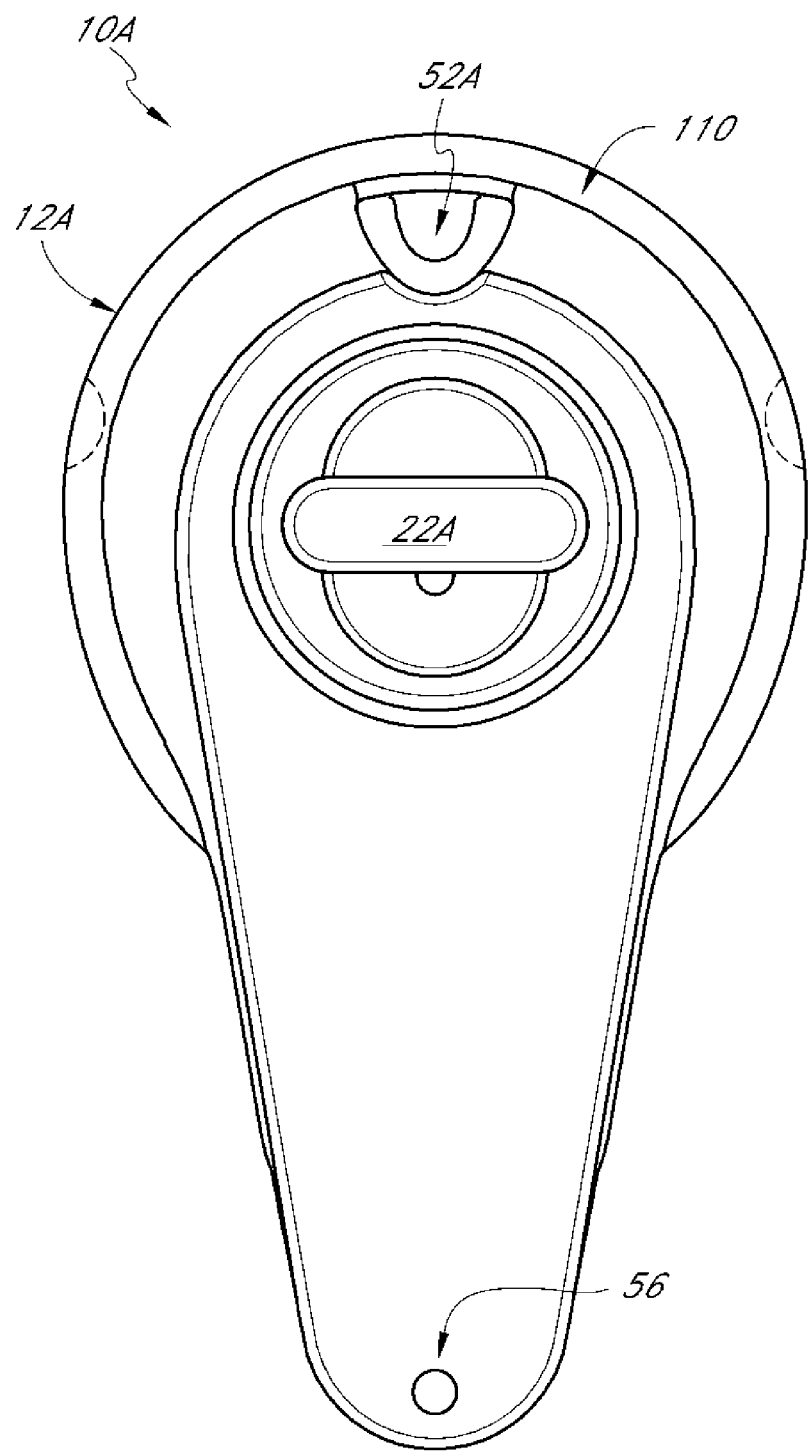
FIG. 4 is a top plan view of the liquid soap dispenser of FIG. 2.
Figure 5:
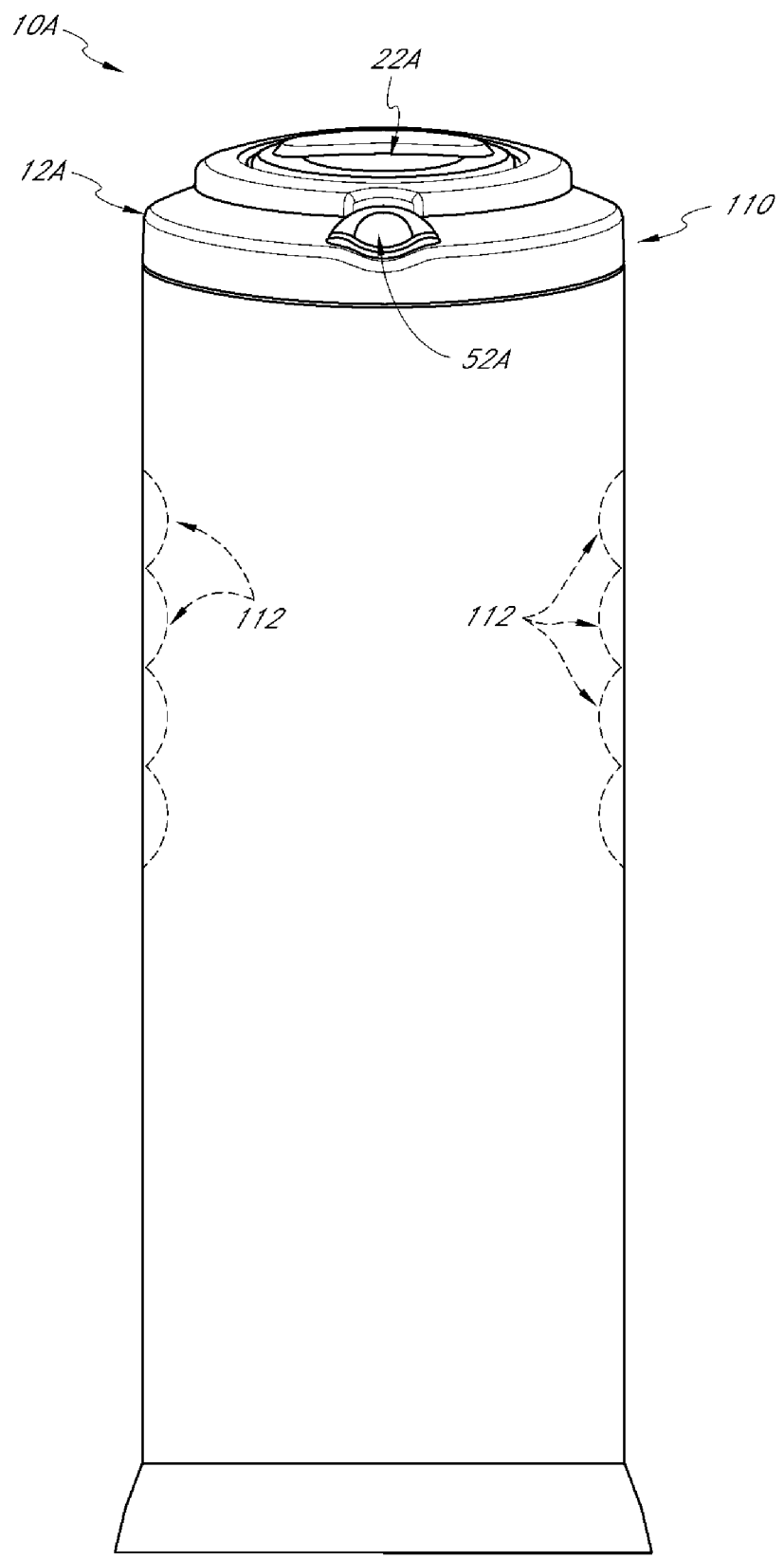
FIG. 5 is a rear elevational view of the liquid soap dispenser of FIG. 2.

With reference to FIGS. 4 and 5, the button 52A can be disposed anywhere on the housing 12A. In some embodiments, as shown in FIGS. 4 and 5, the button 52A can be disposed on an upper portion 110 of the housing 12A. As such, the button 52A is positioned conveniently for actuation by a user of the dispenser 10A.

Further, in some embodiments, the button 52A can be disposed proximate to an outer periphery of the housing 12A, on the upper portion 110, and approximately centered along a rear surface of the housing 12A. As such, this provides a location in which a user can easily grasp the outer surface of the housing 12A with three fingers and their thumb, and actuate the button 52A with their index finger.

Optionally, the housing 12A can include surface textures 112 configured to allow a user to obtain enhanced grip on the housing 12A when attempting to lift the dispenser 10A and depress the button 52A. Such surface textures 112 can have any configuration. In some embodiments, the surface textures 112 are in the form of finger shaped recesses. However, other configurations can also be used.

Figure 6:
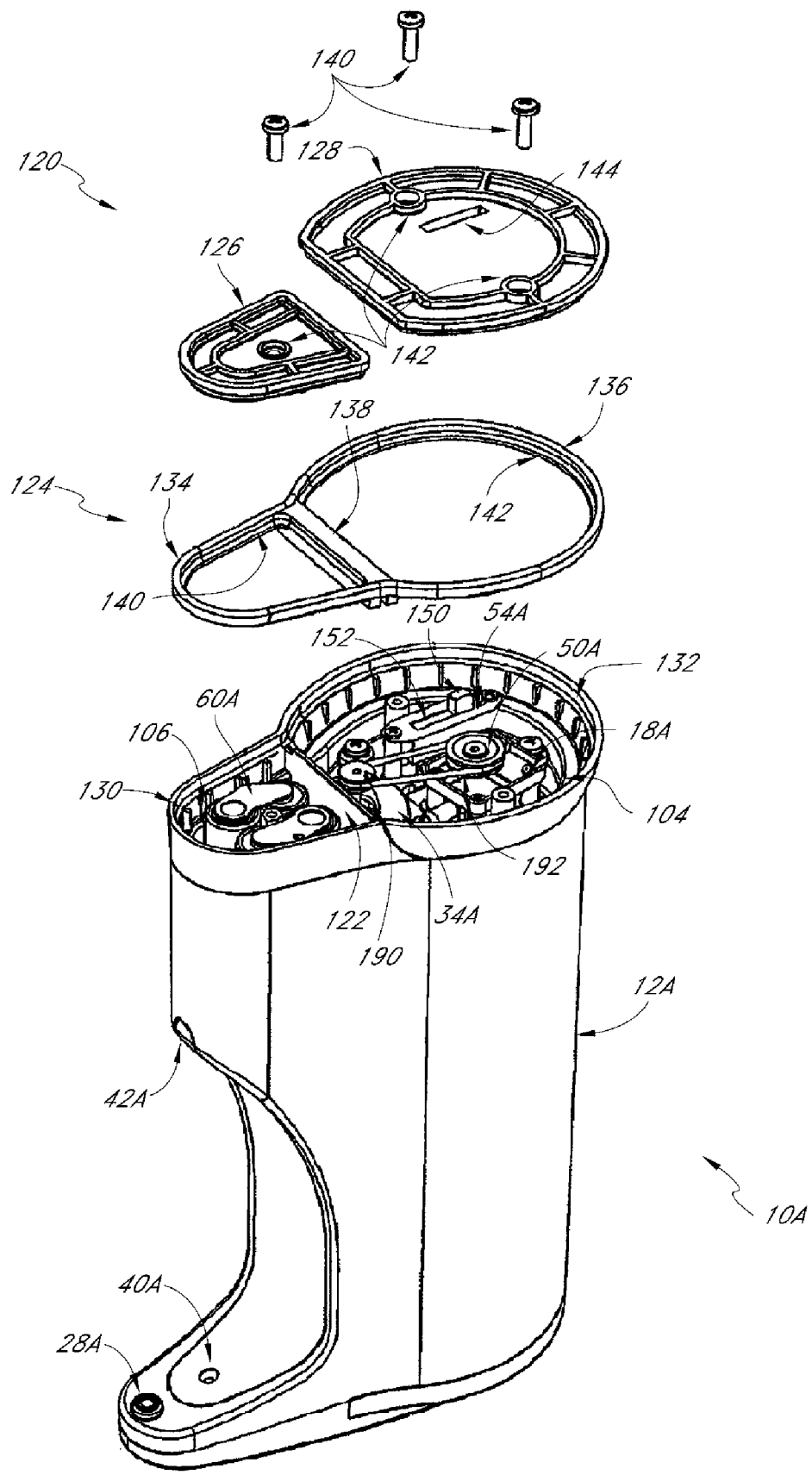
FIG. 6 is a front, bottom, and right side exploded perspective view of the liquid soap dispenser in FIG. 2, showing a pump and motor cavity cover member, a battery compartment cover member, and a gasket separated from the main housing thereof.

With reference to FIG. 6, as noted above, the dispensers 10, 10A can include a support member arrangement 120 that can achieve the dual functions of providing a support leg or foot for the associated dispenser and provide a sealing function for internal cavities disposed within the associated dispenser.

As noted above, the dispenser 10A can include internal cavities 106, 104 for containing the power supply 60A and the pump 18A and actuator 34A, respectively. Of course, as noted above, other interior compartments can also be used.

As shown in FIG. 6, an interior wall 122 is disposed between the compartments 104, 106. However, this is merely optional.

The sealing arrangement 120 can include a gasket member 124 and lid members 126, 128. The gasket 124 can be configured to extend around an opening 130 of the compartment 106 and an opening 132 of the compartment 104. Thus, in some embodiments, the gasket member 124 can include a battery compartment portion 134 and a pump and motor compartment portion 136.

The battery compartment portion 134 is configured to extend around an interior periphery of the opening 130. However, this is just one configuration that can be used. The portion 134 can be configured to straddle a lower-most edge of the opening 130, or to extend around an outer periphery of the opening 130.

Similarly, the portion 136 is configured to extend along an inner periphery of the opening 132. In some embodiments, the portions 134, 136 are configured to rest against a shelf defined along the inner peripheries of the openings 130, 132. However, other configurations can also be used.

A center dividing portion 138 of the gasket 124 can be configured to form a seal along the lower-most edge of the wall 122. However, other configurations can also be used.

The lids 126, 128 are configured to rest against inner walls 140, 142 defined by the portions 134, 136, respectively. As such, the lid members 126, 128 form seals with the inner peripheral walls 140, 142, respectively. The seals help protect the components disposed within the compartments 106, 104.

Optionally, fasteners 140 can be used to secure the lid members 126, 128 to the housing 12A. For example, the lid members 126, 128 can include apertures 142 through which the fasteners 140 can extend. The fasteners 140 can engage mounting portions disposed within the housing 12A. As such, the lid members 126, 128 can be secured to the housing 12A and form a seal with the gasket member 124.

Optionally, at least one of the lid members can include an additional aperture 144 configured to allow access to a device disposed in one of the compartments 104, 106. In the illustrated embodiment, the aperture 144 is in the form of a slot. However, any type of aperture can be used.

The slot 144 can be configured to allow a portion of the selector 54 to extend therethrough. For example, the selector 54A is in the configuration of a slider member 150 slidably disposed in a housing 152. As such, for example, the selector 54 can be in the configuration of a rheostat or other type of input device that allows for a proportional signal.

For example, as noted above, the housing 152 can be configured to allow the member 150 to be slid between at least two positions. For example, the two positions can be a first position corresponding to a first amount of liquid soap L to be discharged by the nozzle 28A and a second position corresponding to a second larger volume of liquid soap L to be discharged by the nozzle 28A. Optionally, the housing 152 can be configured to allow the member 150 to be slid between a plurality of steps or continuously along a defined path to provide continuously proportional signals or a plurality of steps.

In some embodiments, with the gasket member 124 and lid member 128 in place, the slider member 150 can be configured to extend through the slot 144 such that a user can conveniently move the slider member 150 with the lid 128 in place. In other embodiments, the slider member 150 can be smaller such that an object such as a pen can be inserted into the slot 144 to move the slider member 150. Other configurations can also be used.

With continued reference to FIG. 6, when the lids 126, 128 and gasket member 124 are in place, the compartments 104, 106 are substantially sealed and thus protected from the ingress of water and/or other substances. Additionally, as noted above, the gasket member 124 can be configured to extend downwardly from the housing 12A such that the gasket member 124 defines the lower-most portion of the device 10A. As such, the gasket member provides a foot or a leg for supporting the device 10A.

Further, in a configuration in which the lower-most edge of the gasket member 124 is substantially continuous and smooth, the gasket member 124 can provide a suction cup-like effect when it is placed and pressed onto a smooth surface. For example, where the gasket member 124 is made from a soft or resilient material, by pressing the device 10A downwardly when it is resting on a smooth surface, air can be ejected from the space between the lid members 126, 128 and the surface upon which the device 10A is resting. When the device 10A is released, the slight movement of the device 10A upwardly can cause a suction within that space, thereby creating a suction cup-like effect. This effect provides a further advantage in helping to anchor the device 10A in place on a counter, which can become wet and/or slippery during this period.

Figure 9:
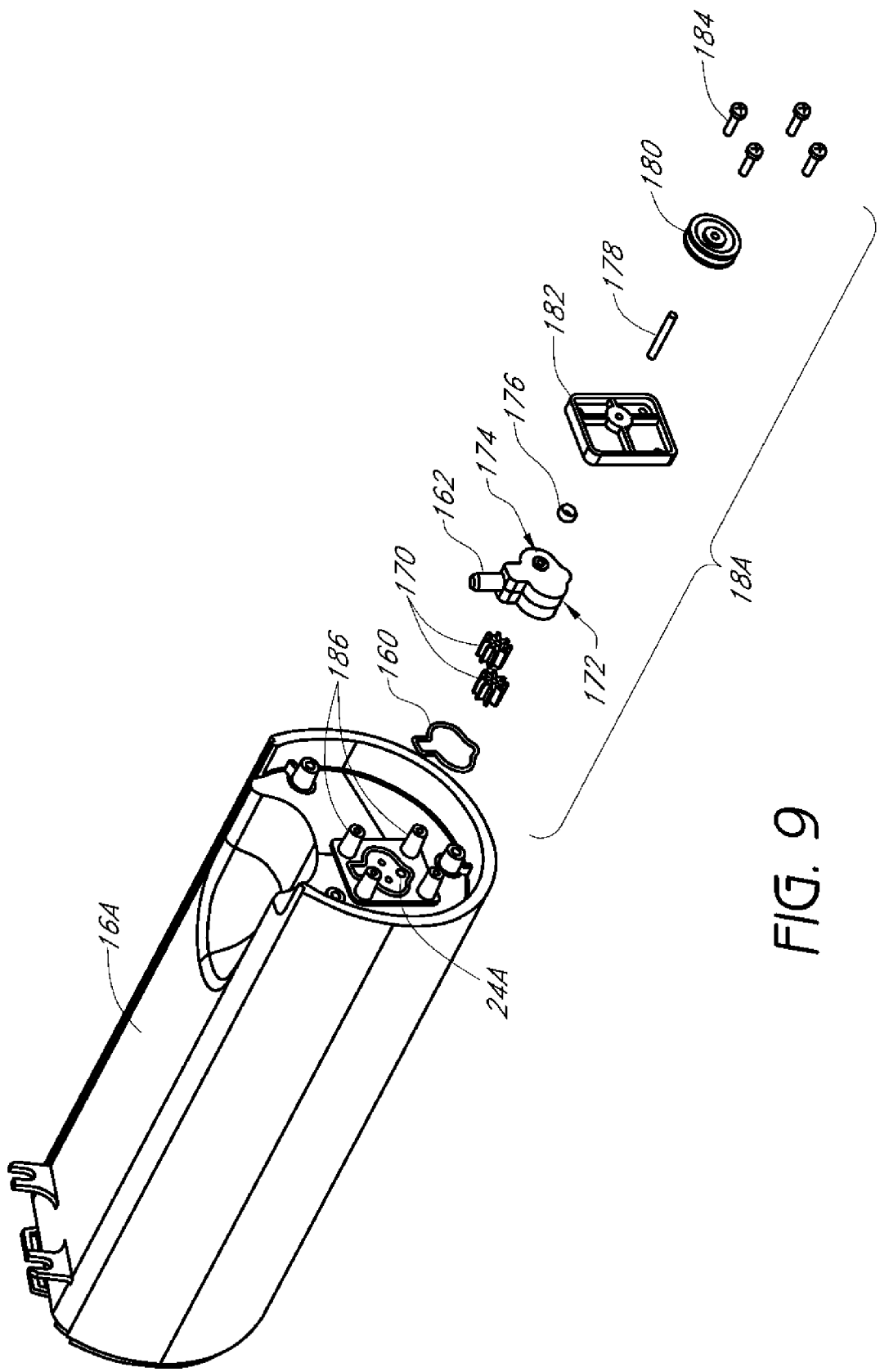
FIG. 9 is a front, left, and bottom perspective view of the reservoir of the liquid soap dispenser of FIG. 2 and having the pump member exploded and separated from the bottom.

With reference to FIGS. 7-9, the pump 18A can be configured to be a reversible pump. For example, in the illustrated embodiment, the pump 18A is a gear-type pump. This type of a pump can be operated in forward or reverse modes. Additionally, this type of pump provides a compact arrangement and can provide a 90 degree turn which provides a particularly compact arrangement in the device 10A. For example, as shown in FIG. 7, the outlet 24A of the reservoir 16A feeds directly into an inlet of the pump 18A. More particularly, in the illustrated embodiment, a lower-most surface of the reservoir 16A defines an upper wall of the pump 18A. Thus, the outlet 24A also forms the inlet to the pump 18A. A gasket 160 extends around the outlet 24A and is configured to form a seal with a body of the pump 18A.

With continued reference to FIG. 7, an outlet 162 of the pump 18A is connected to an outlet chamber of the pump 18A. Although not illustrated in FIG. 7, the outlet 162 is connected to the conduit 26A so as to connect the outlet 162 to the nozzle 28A.

FIG. 9 illustrates an exploded view of the pump 18A. As shown in FIG. 9, the gear pump 18A includes a pair of gear members 170, a gear pump body 172, from which the outlet 162 extends.

The pump body 172 defines a generally oval and/or partially figure 8-shaped internal chamber in which the gears 170 rotate. This configuration is well known in the art, and in particular, with regard to devices known as gear pumps. Thus, a further description of the operation of the gear pump 18A is not included herein.

The housing 172 can also include a drive shaft aperture 174. A gasket 176 can be configured to form a seal against the pump housing aperture 174 and a drive shaft 178. One end of the drive shaft 178 can be connected to a driven sheave 180. The other end of the drive shaft 178 extends through the gasket 176, the aperture 174, and engages with one of the gears 170.

In some embodiments, a member 182 can be also used to retain the pump housing 172 against the lower face of the reservoir 16A. For example, in the illustrated embodiment, four fasteners 184 extend through corresponding apertures in the member 182 and into engaging portions 186 attached to the lower face of the reservoir 16A.

As is well known in the art of gear pumps, the gears 170 are meshed within the pump chamber 172. Thus, when a shaft 178 is rotated to rotate one of the gears 170, the other gear 170 is also rotated. As such, the pump 18A can displace fluid entering the pump body 172 through the outlet 24A and discharge the fluid through the outlet 162.

With reference again to FIG. 6, the sheave 180 defines a part of the transmitter 50A. The actuator 34A can also include a drive sheave 190 configured to drive the driven sheave 180 through a flexible transmitter 192. The flexible transmitter 192 can be any type of flexible transmitter, such as those well known in this art. For example, but without limitation, the flexible transmitter 192 can be a toothed belt, rubber belt, chain, etc. However, other configurations can also be used.

Figure 10:
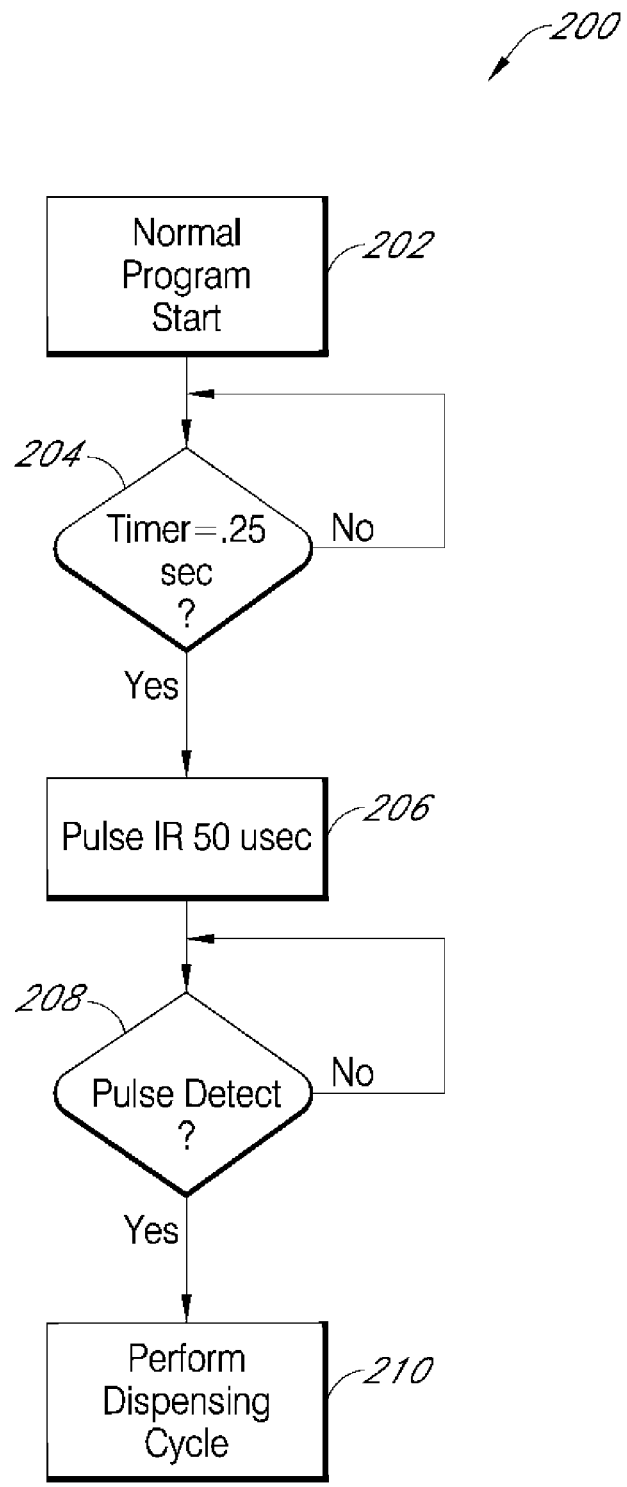
FIG. 10 is a schematic flow chart of a control routine that can be used with the automatic liquid soap dispensers of FIGS. 1-9.

FIG. 10 schematically illustrates a control routine 200 that can be used with any of the dispensers 10, 10A described above, or with other devices. As noted above, the ECU 46, which can be disposed anywhere in the device 10A, can include modules for controlling various aspects of the operation of the dispenser 10, 10A. The modules described below with reference to FIGS. 10-13 are described in the form of flowcharts representing control routines that can be executed by the ECU 46. However, as noted above, these control routines can also be incorporated into hard wired modules or a hybrid module including some hard wire components and some functions performed by a microprocessor.

With reference to FIG. 10, the control routine 200 can be used to control the actuation of the sensor 32 (FIG. 1) or any other sensor. The control routine 200 is configured to periodically activate the sensor 32, so as to reduce power consumption. Although only sensor 32 is referenced below, it is to be understood that any sensor or combination of sensors can be controlled to reduce power consumption easing the techniques illustrated with reference to the control routine 200.

For example, the control routine 200 can begin operation in the operation block 202. In the operation block 202, the control routine 200 can be started when batteries are inserted into the battery compartment 106, when a power switch (not shown) is moved to an on position, when an AC power source is connected to the ECU 34, or at any other time. After the operation block 202, the routine 200 moves onto a decision block 204.

In the decision block 204, it can be determined whether a timer has reached a predetermined time activation interval. For example, the ECU 46 can include a timer and, initially setting a timer counter value to zero, determine whether the timer has reached a predetermined actuation time interval, such as, for example, one quarter of one second. However, other time intervals can also be used.

If, in the decision block 204, the timer has not reached the predetermined time interval, the routine 200 returns and repeats. On the other hand, if in the decision block 204, the timer has reached the predetermined time interval, the routine 200 moves onto an operation block 206.

In the operation block 206, a sensor can be activated. For example, the ECU 46 can activate the sensor 32. In some embodiments, the ECU 46 can activate the light emitter portion 40 and the light receiver portion 42 of the sensor 32.

In some embodiments, a further advantage can be achieved by activating the sensor 32 for a period of time shorter than the predetermined activation time interval used in decision block 204. For example, in some embodiments, the sensor 32 can be activated for a predetermined duration time period of about 50 microseconds. However, other time periods can also be used.

With the activation duration time period of the operation block 206 being shorter than the predetermined activation time interval of decision block 204, the sensor 32 is not continuously operating. Thus, the power consumption of the sensor 32 can be reduced. When the exemplary embodiment in which the predetermined activation time interval of the sensor block 204 is about ¼ of a second and the duration time period of operation block 206 is 50 microseconds, the sensor 32 is only operating about 0.02% of the time. Thus, a user will only have to wait a maximum of about ¼ of one second before the ETU 46 can detect the activation of the sensor 32.

With regard to the activation of the sensor 32, the ECU 46 can be configured to, as described above, activate the light emitting portion 40 and determine whether or not the light beam 44 has reached the light receiving portion 42. If during such activation, the light receiving portion 42 does not detect the light beam 44, the ECU 46 can determine that the sensor 32 is activated.

For example, after the operation block 206, the routine 200 can move on to a decision block 208 in which it is determined whether or not a pulse of light, such as the light beam 44, has reached the light receiving portion 42. More particularly, for example, the ECU 46 can be configured to absorb the output from the sensor 32 for any interruption of the signal. For example, the ECU 46 can be configured to compare the actuation of the light emitting portion 40 with the signal output from the light receiving portion 42. If there is an interruption, the ECU 46 can determine that a pulse, or an interruption of the light beam 44, has been detected.

If, in the decision block 208, a pulse has not been detected, the routine 200 can return and repeat. Optionally, in some embodiments, the routine 200 can return to a decision block 204 and repeat, although this return is not illustrated in FIG. 10. On the other hand, if it is determined in decision block 208, that a pulse has been detected, the routine 200 can move on to an operation block 210.

In the operation block 210, the routine 200 can perform a dispensing cycle. For example, the ECU 46 can operate the actuator 34 to drive the pump 18 to dispense liquid soap L from the nozzle 28. In some embodiments, the dispensing cycle can also include the step of operating the indicator 56, 56A to provide the user a timer regarding the time over which the use should continue to wash their hands. For example, but without limitation, such a step can include activating the indicator 56, 56A (which can be a visual indicator such as an LED light, for the predetermined time of about 20 seconds, after the pump has completed discharging an amount of soap. However, other steps or methods can also be used.

Figure 11:
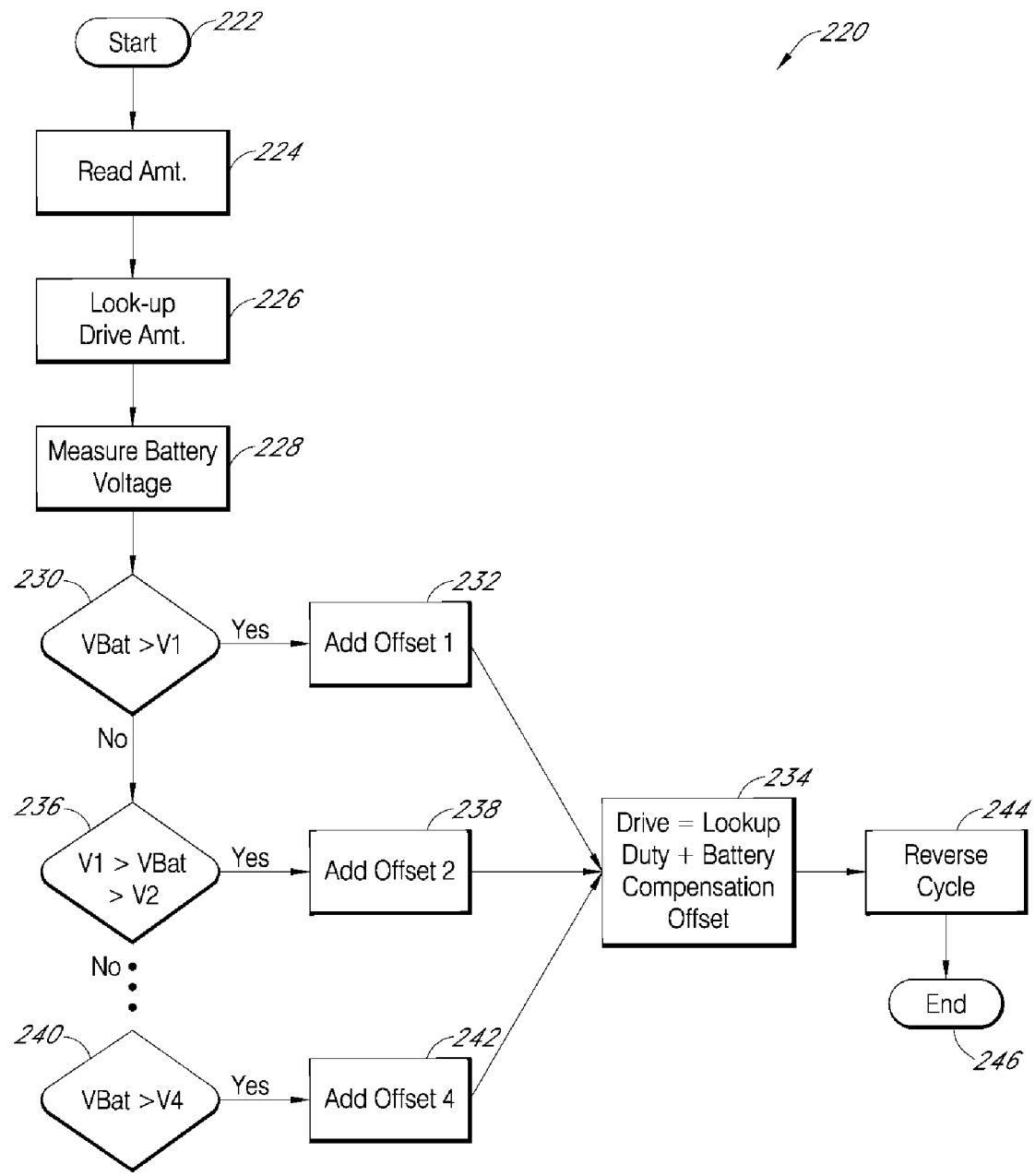
FIG. 11 is a flow chart of another control routine that can be used with the liquid soap dispensers of FIGS. 1-9.

With reference to FIG. 11, a control routine 220 can be used for performing the dispensing cycle identified in operation block 210 (FIG. 10). However, other control routines can also be used.

With continued reference to FIG. 11, the control routine 220 can be configured to activate certain components of the device 10, 10A at any time. In some embodiments, for example, the routine 220 can begin an operation block 222 at any time. In some embodiments, the operation block 222 can begin when the ECU 46 detects an interruption of the light beam 44. More specifically, for example, but without limitation, the routine 222 can begin if the routine 200 reaches operation block 210. After the operation block 222, the routine 220 can move on to operation block 224.

In the operation block 224, the amount of soap to be dispensed can be determined. For example, in the operation block 224, the ECU 46 can sample the output from the selector 54. As noted above, the selector 54 can provide output in the form of two or more values. Such values can be a plurality of values or the continuous proportional signal or values proportional to the position of the member 150 (FIG. 6). After the operation block 224, the routine 220 can move on to an operation block 226.

In the operation block 226, the value from the selector 54 can be correlated to a drive amount indicative of the magnitude of actuation that should be applied to the motor 34, 34A. For example, the drive amount can be a value associated with a duration of time over which the motor 34, 34A should be driven, a number of rotations of the output shaft of the motor 34, 34A or another value corresponding to an amount of liquid soap L to be discharged from a nozzle 28, 28A. After the operation block 226, the routine 220 can move on to an operation block 228.

In the operation block 228, the voltage of the power source 60, 60A can be detected. For example, the ECU 46 can read the voltage of the power source 60. In some embodiments, the power source 60, 60A is a plurality of batteries. In an exemplary but nonlimiting embodiment, the power source 60A comprises four AA batteries. As is well known in the art, over time, the voltage of such batteries will drop. Thus, by detecting the voltage of these batteries, device 10, 10A can compensate for drops in voltage over time. For example, the ECU 46 can include an analog to digital converter to sample the voltage of the power supply 60, 60A. Other detectors can also be used. After the operation block 228, the routine 220 can move on to a decision block 230.

In the operation block 230, it can be determined whether the voltage of the power supply 60, 60A is greater than a first predetermined voltage V1. The predetermined voltage V1 can be any voltage.

In some embodiments, the voltage V1 is set at a voltage that corresponds to a substantially fully charged state of the power supply 60, 60A, for example, where the power supply 60, 60A is a disposable or rechargeable battery. Thus, for example, the power supply 60, 60A comprises for AA cell batteries, each rated at 1.5 volts, and thus, the fully charged state of the power supply 60, 60A would be about 6 volts. However, as well known in the art, fully charged AA cell batteries often carry a charge of about 1.6 volts each when they are fully charged and brand new. Thus, the voltage V1 can be 6 or 6.4 volts depending on the level of accuracy desired.

In other words, as described below, the voltage Vbat of the power supply 60, 60A to be compared to several additional voltage thresholds. The more voltage thresholds that are used, the more accurately the ECU 46 can drive the actuator 34 so as to provide a consistent speed of discharge of liquid soap L from the nozzle 28, 28A.

With continued reference to a decision block 230, if it is determined that the voltage Vbat of the power supply 60, 60A is greater than the first predetermined voltage threshold V1, the routine 220 can move on to an operation block 232.

In the operation block 232, an offset value can be determined. For example, the offset value 1 can be predetermined to achieve a desired speed of the pump 18, 18A. In some embodiments, the magnitude of the value offset 1 can be the largest of offset values.

For example, in some embodiments, the value of offset 1 can be −30%. As such, when the voltage Vbat of the power supply 60, 60A is at its greatest value, and largest (negative) offset is applied. As such, the voltage Vbat of the power supply 60, 60A is at its greatest value, and largest (negative) offset is applied. As such, the voltage Vbat of the power supply 60, 60A drops over time, smaller (negative) offset values can be applied to thereby achieve a substantially uniform speed of the pump 18, 18A and thus are substantially uniform speed of discharge of liquid soap L, nozzle 28, 28A, as the voltage of the power supply 60, 60A discharges over time. After the operation of block 232, the routine 220 can move to operation block 234.

In the operation block 234, the drive value determined in operation block 226 is added with the offset value, at this point when the routine 220, the drive value is added toward the value offset 1. Thus, in an embodiment where the values of Offset 1 is −30%, the drive value claimed in operation block 226 is reduced by 30%. Thus, in the operation block 334, the motor or actuator 34 is driven at this resulting drive value.

With regard to the drive value applied to the actuator 34, the power output from the power supply 60, 60A can be varied in any known way. For example, where the drive power signals applied to the motor 34A are in the form of a duty cycle, characteristics of the duty cycle can be varied to achieve a varying power applied to actuator 34. For example, but without limitation, the pulse width of the duty cycle applied to the actuator 34 can be increased or decreased. However, there is a maximum point of adjustment for an electric motor, such as the motor 34. Thus, the maximum adjustment allowed by the technique used to adjust power output as the motor 34 would be considered a 100% drive value.

In reference again to the decision block 230, if it is determined that the voltage of the power supply Vbat is not greater than V1, and the routine 220 moves to operation block 236.

In the decision block 236, it can be determined whether the voltage of the battery Vbat is less than the voltage V1 and greater than another predetermined voltage V2. As noted above, with regard to the description of the voltage V1, the voltage V2 can be set at a voltage indicative of a voltage normally reached by a power supply as the battery cells discharge but are still useful. First, it is determined in the decision block 236, that the voltage Vbat is less than the voltage V1 but greater than the voltage V2, the routine can move on to operation block 238.

In the operation block 238, another offset value can be determined. For example, in the operation block 238, the offset can be determined as Offset 2. In an exemplary but nonlimiting embodiment, the value of Offset 2 can be −20%. As such, as noted above, as the voltage of the power supply 60, 60A drops, the magnitude of the offset value drops (to a smaller negative value) thereby compensating for the decrease in voltage of the power supply 60, 60A. After the operation block 238, the routine 220 can move on through operation block 234 and continues as described above.

With reference again to decision block 236, if the determination therein is negative, the routine can move on to other decision blocks. There can be any number of decision blocks similar to the decision block 230, 236, depending on how many steps or stages of the discharge state of the power supply 60, 60A are contemplated.

Decision block 240 represents an exemplary final decision block that can be used in the series. In the decision block 240, it can be determined whether the voltage Vbat of the power supply 60, 60A below a final reference voltage V4. The final reference voltage V4 can be a voltage below which there is very little use for power left in the power supply 60 below a final reference voltage V4. The final reference voltage V4 can be a voltage below which there is very little use for power left in the power supply 60, 60A, and shutdown of the ECU 46 is imminent. However, other reference voltages can also be used. If, in the decision block 240, it is determined that the voltage Vbat is less than the reference voltage V4, the routine 220 moves on to operation block 242.

In the operation block 242, a final offset value Offset 4 can be determined. In some exemplary, but nonlimiting embodiments, the offset value offset 4 is 0%. Thus, for example, the full value of the drive value determined in the operation block 226 is applied to the actuator 34, in the operation block 234. However, in some embodiments, the value of Offset 4 can be a value that will result in a 100% value for the drive value. After the operation block 234, the routine 220 can move on to operation block 244.

In the operation block 244, the ECU 46 can operate the actuator 34 in reverse, to thereby reverse operation of the pump 18, 18'. The amount of actuation of the actuator 34, 34A can be predetermined to provide sufficient movement of liquid soap L, backwards through the conduit 26, 26A such that liquid soap L does not drip from the nozzle 28, 28A. This amount can be predetermined through routine experimentation. Additionally, the amount of actuation of the actuator 34, 34A can be varied based on battery voltage, in the same manner as that set forth in the routine 220 with regard to the discharge of a liquid soap L from a nozzle 28, 28A.

After the operation block 224, the routine 220 can move on to operation block 246. Thus, each time the routine 200 (FIG. 10) reaches operation block 210 which is described as the performance of dispensing cycle, the routine 220 can operate, provide a substantially uniform dispensations of liquid soap L, regardless of battery voltage, then reverse the flow of liquid soap L therein to prevent dripping, and then end.

Additionally, in some embodiments, the device 10, 10A can include another timer, which can be in the form of another control routine (not shown) to prevent the routine 220 from being repeated within a predetermined time period. For example, this timer or control routine can prevent the repeat of operation block 220 within two seconds. As such, there is at least a two-second delay between dispensation cycles. However, other predetermined time periods can also be used.

Figure 12:
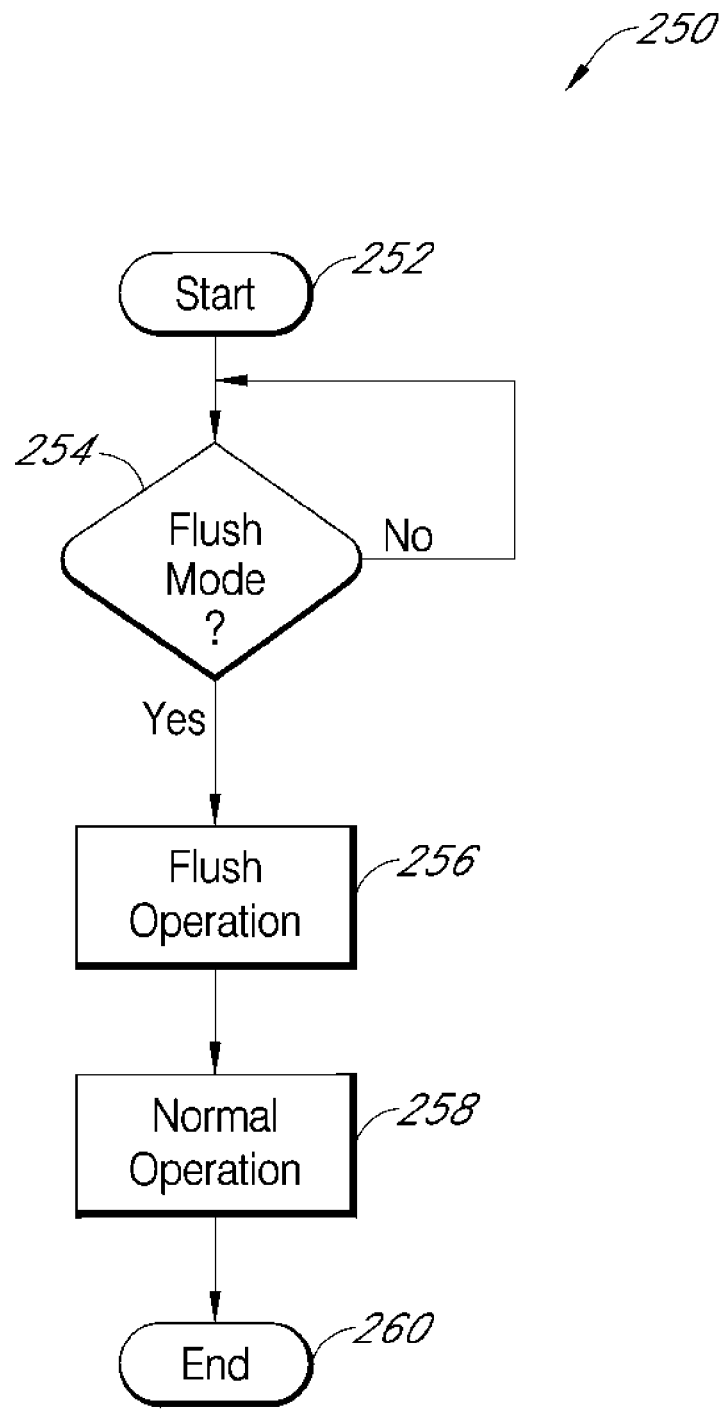
FIG. 12 is a flow chart of another control routine that can be used with the liquid soap dispensers of FIGS. 1-9.

With reference to FIG. 12, the devices 10, 10A can also be configured to cyclically reverse flow of liquid soap L for clearing clogs.

For example, the routine 250 can begin an operation block 252. For example, the operation block 252 can allow the control routine 250 to continue at any time during operation, for example, immediately after putting in new batteries connecting any other type of power supply, or at any other time. After the operation block 252, the routine 250 can move on to a decision block 254.

In the decision block 254, it can be determined whether or not the device 10, 10A is to be operated in a flush mode. For example, the ECU 46 can determine if the button 52 has been actuated in a predetermined pattern, indicating that the user wishes to enter the flesh mode. For example, but without limitation, the predetermined pattern of operation can be two or more quick and serial actuations of the button 52. If it is determined that the flush mode is not to be entered in the decision block 254, the routine 250 can return and repeat. If, on the other hand, it is determined that the flush mode is to be entered, the routine 250 can move on to operation block 256.

In the operation block 256, the device 10, 10A can enter a flush operation. For example, but without limitation, the ECU 46 can operate the actuator 34 in forward and reverse mode, to thereby drive the pump 18, 18A, and forward in reverse modes cyclically. The number of forward and reverse cycles of the corresponding pump 18, 18A can be any number. Additionally, the duration of the drive of the pump 18, 18A in each direction can be any value. For example, the magnitude of the forward and reverse drives can be equal to or less than the amount of time required for the pump 18, 18A to draw all the liquid soap L in the conduit 26, 26A back to the outlet of the pump 18, 18A. As such, it will prevent air from being sucked into the pump 18, 18A. Additionally, the long duration of the reverse and forward modes can further enhance the ability to flush a clog out of the conduit 26, 26A. For example, when entering the flush mode operation, a user can hold a cup of warm or hot water against the nozzle 28, 28A. Thus, during reverse operation of the cup 18, 18A, warm or hot water can be drawn down into the conduit 26, 26A thereby speeding the removal of a clog from the nozzle 28, 28A, or the conduit 26, 26A. After the operation block 256, the routine 250 can move on to operation block 258.

In the operation block 258, the device 10, 10A can return to normal operation. For example, the device 10, 10A can return to the control routine 200 (FIG. 10). After the operation block 258, the routine 250 can move on to the operation block 260 and end.

Figure 13:
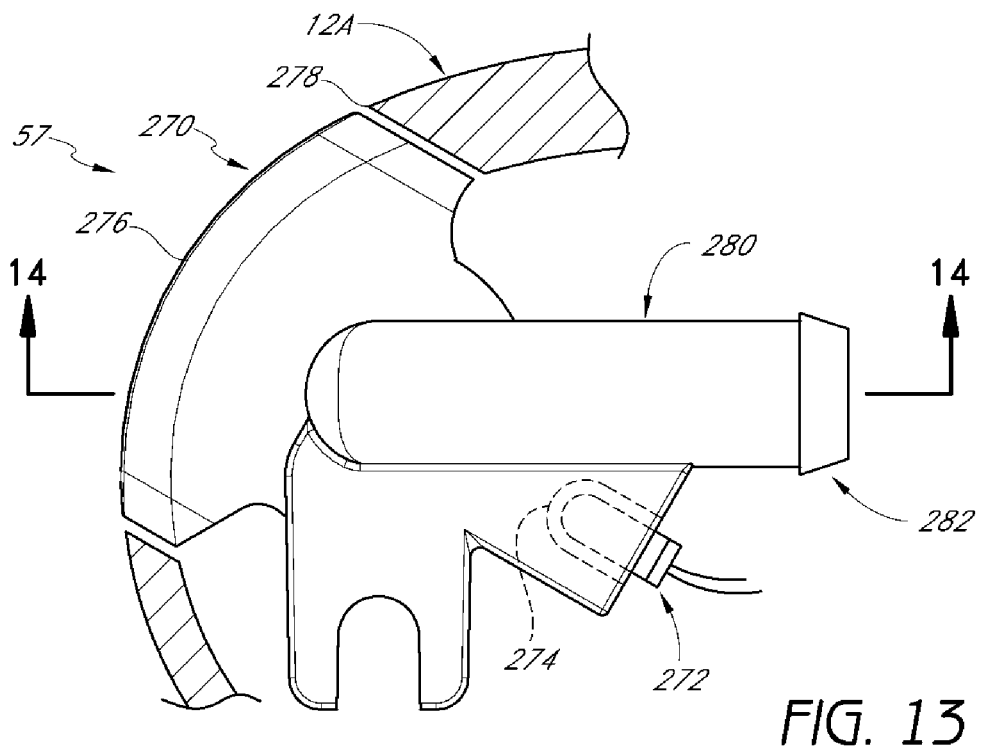
FIG. 13 is a top plan view of a soap outlet assembly that can be used with the liquid soap dispenser of FIGS. 1-12.
Figure 14:
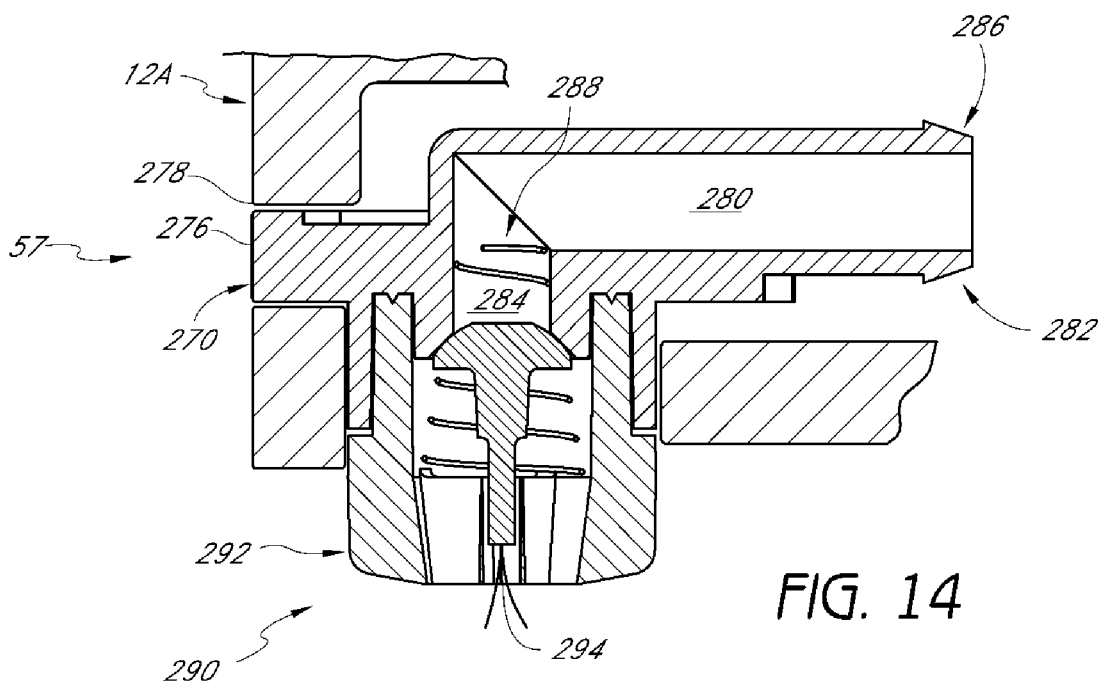
FIG. 14 is sectional view of the soap outlet assembly, taken along line 14.-14. of FIG. 13, with a valve in a closed position.

As noted above with reference to FIG. 2, the dispenser 10A can include an indicator 57. With reference to FIGS. 13 and 14, the indicator 57 can be formed in any known manner. In some embodiments, the indicator 57 can include a light guide portion 270 and a light source 272. In some embodiments, the light source 272 can be an LED light. However, any type of light source can serve as the light source 272.

The light guide member 270 can have any shape or configuration. In some embodiments, the light guide 270 is formed from an opaque, translucent, or transparent material. In some embodiments, the light guide 270 can be an opaque plastic material, such as, for example, but without limitation, acrylic or polycarbonate. However, other materials can also be used. In some embodiments, parts of the light guide 270 can be assembled or connected to other parts by ultrasonic welding, and thus, in such embodiments, it is preferable to use materials that can be connected by ultrasonic welding.

In some embodiments, the light guide portion 270 can include a light source receiving portion 274 configured to receive the light source 272. For example, although not illustrated, the light source receiving portion 274 can include a mounting surface to which the light source 272 can be mounted with any type of fastener or attachment of technique, including screws, adhesives, etc. In the illustrated embodiment, the light source receiving portion 274 is in the shape of a cylinder with a rounded interior end portion having the shape generally complementary to LED lights that are widely commercially available. However, the light source receiving portion 274 can have any shape.

By configuring the light source receiving portion 274 to have an interior shape that is complementary to the light source 272, the light guide 270 is better able to absorb light emitted by the light source 272. However, in other configurations, the light source 272 can simply be mounted in the vicinity of a surface of the light guide member 270.

The light guide member 270 can also include an outwardly facing surface 276. In some embodiments, the outwardly facing surface 276 can have a shape that is complementary to the adjacent portions of the outer housing 12A. For example, in the illustrated embodiment, the outer housing 12A includes a generally rectangular and curved opening 278. The opening 278 can be sized and shaped such that a portion of the light guide member 270 can extend to or through the opening such that the outwardly facing surface 276 can be visible from the exterior of the outer hosing 12A. Additionally, in some embodiments, the opening 278 can be sized such that the outwardly facing surface 276 can be mounted flushly with the outer surface of the housing 12A.

The light guide 270 can be configured to conduct light from the light source 272 to the outwardly facing surface 276. For example, in some embodiments, the light guide member 270 can be formed from a single monolithic piece of any of the materials noted above. However, in other embodiments, the light guide member 270 can be formed by a plurality of individual pieces connected together. However, joints within the light guide member 270 can block some of the light from the light source and prevent some of the light from reaching the outwardly facing surface 276. In any of these embodiments, however, the light source 272 can be activated in accordance with the description set forth above with regard to the indicator 56 and 56A.

In some embodiments, the light guide member 270 can also include a fluid passage 280. In the illustrated embodiment, the fluid passage 280 includes an inlet end 282 and an outlet end 284. The inlet end 282 can be connected to the conduit 26A so that liquid soap from the pump 18A can be fed through the food passage 280 and out of the device 10A. As shown in FIGS. 13 and 14, the inlet end 282 can include a barb 286 to help in securing the passage 26A thereto. Additionally, the fluid passage 280 can include internal baffles 288 to help slow the flow of liquid soap L therethrough and/or help prevent drips.

In some embodiments, the fluid passage 280 can be formed monolithically with the light guide member 270. As such, light emitted from the light source 272 and traveling to the outwardly facing surface 276 can also flow through portions of the materials forming the fluid passage 280. As such, the light can help heat the passage 280 and thereby prevent clogs or dislodge amounts of liquid soap that may clog the passage 280, the discharge end 284, and/or the baffles 288. Additionally, even if the passage 280 is not formed monolithically with the light guide member 280, heat from the light source 272 can still aid in preventing or dislodging clogs of the passage 280.

Figure 15:
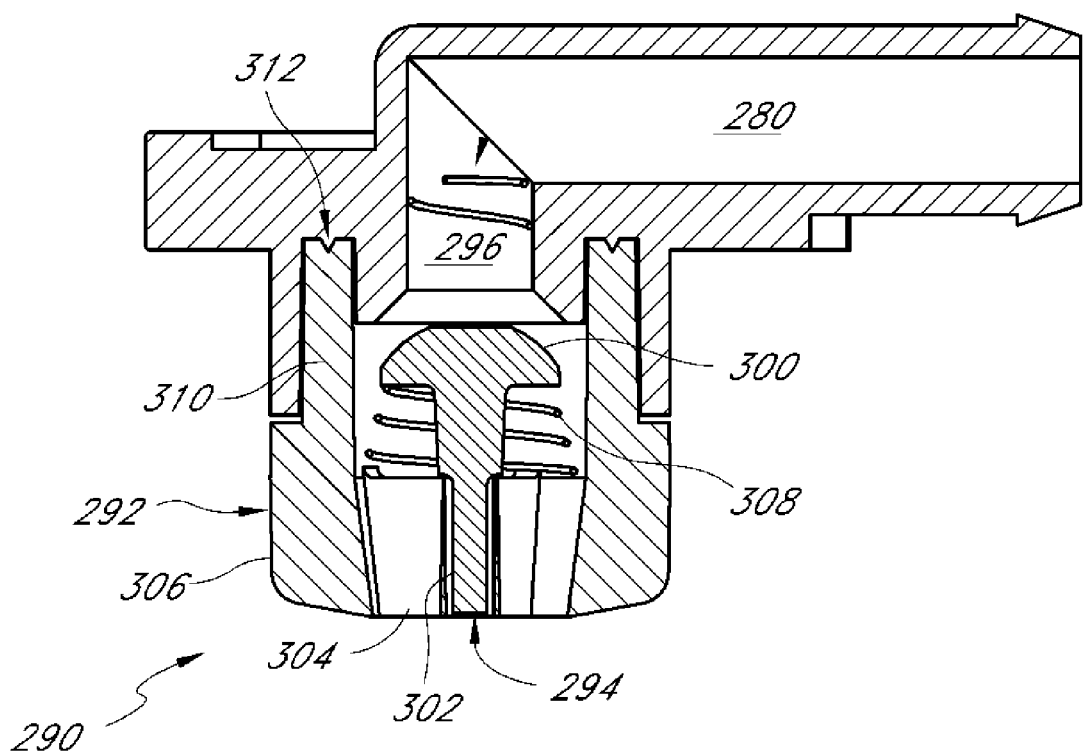
FIG. 15 is another sectional view of the soap outlet assembly, taken along line 14.-14. of FIG. 13, with the valve in a closed position.

An additional advantage can be achieved where the device 10A includes a valve configured to seal the end 284 of the fluid passage 280 when the pump 18A is not operating. For example, in some embodiments, the device 10A can include a valve 290 which is configured to open during operation of the pump 18A and to close when the pump 18A stops. For example, in some embodiments, the valve 290 can include a valve housing 292, a valve 294, and a valve seat 296 (FIG. 15).

The valve body 294 can include a valve face 300 configured to form a seal with the valve seat 296 when the face 300 is brought into contact with the seat 296. In the illustrated embodiment, the body 294 also includes a stem 302 which is configured to cooperate with a plurality of alignment fins 304.

The alignment fins 304 extend inwardly from a lower end 306 of the valve body 292. The alignment fins 304 define a central passage in which the stem 302 can reciprocate.

As such, the alignment fins 304 can guide the valve body 294 upwardly and downwardly through a motion between an open position (FIG. 15) and a closed position (FIG. 14). Further, the fins 304 can both provide an alignment surface for guiding the stem 302 in a reciprocal motion and also allow passage of liquid soap from the outlet end 284 of the passage 280 down through the lower end of the valve body 292.

Additionally, the valve 290 can include a spring 308 configured to bias the valve body 294 toward the closed position illustrated in FIG. 14. The strength of the spring 308 can be chosen so as to provide a satisfactory sealing force between the valve face 300 and the valve seat 296 such that liquid soap does not leak out of the valve 290 when the pump 18A is not operating.

A further advantage can be achieved where the valve seat 296 and the valve face 300 have different shapes.

For example, in some embodiments, the valve seat 296 can be a flat conical shape. Additionally, in such embodiments, the valve face 300 can be curved, for example, generally spherical or hemispherical. As such, when the valve face 300 contacts the valve seat 296, the contact patch between these two surfaces 296, 300 generally falls along a line. As such, higher pressures can be generated between the valve face 300 and the valve seat 296 thereby providing a better seal and increasing the likelihood that any thickened, harder pieces of liquid soap, or foreign particles that may be in the vicinity of the valve seat 296 when the valve face comes into contact therewith, will be pinched, cut, crushed, or pushed away thereby ensuring a satisfactory seal.

Additionally, by forming at least one of the surfaces 296, 300 as a spherical surface and the other surface as a conical surface, the surfaces 296, 300 can form a seal without relying on a precise alignment therebetween. Rather, if the stem 302 does not remain perfectly aligned and thus allowing the valve face 300 to tilt relative to the valve seat 296, a seal will still be generated therebetween.

In some embodiments, the valve body 292 can include an upper extension 310 that fits into a channel 312 formed in the light guide member 270. Additionally, an O-ring seal or another type of seal can be provided between the channel 312 and the extension 310. These parts can be connected with adhesives, ultrasonic welding, or any other known technique. Optionally, these connections are air tight.

While the valve 290 provides enhanced operation of the device 10A, further advantages can be achieved where the spring 308, or any other type of biasing device, is mounted in a way such that it is not within the flow of liquid soap through the valve body 292.

Figure 16:
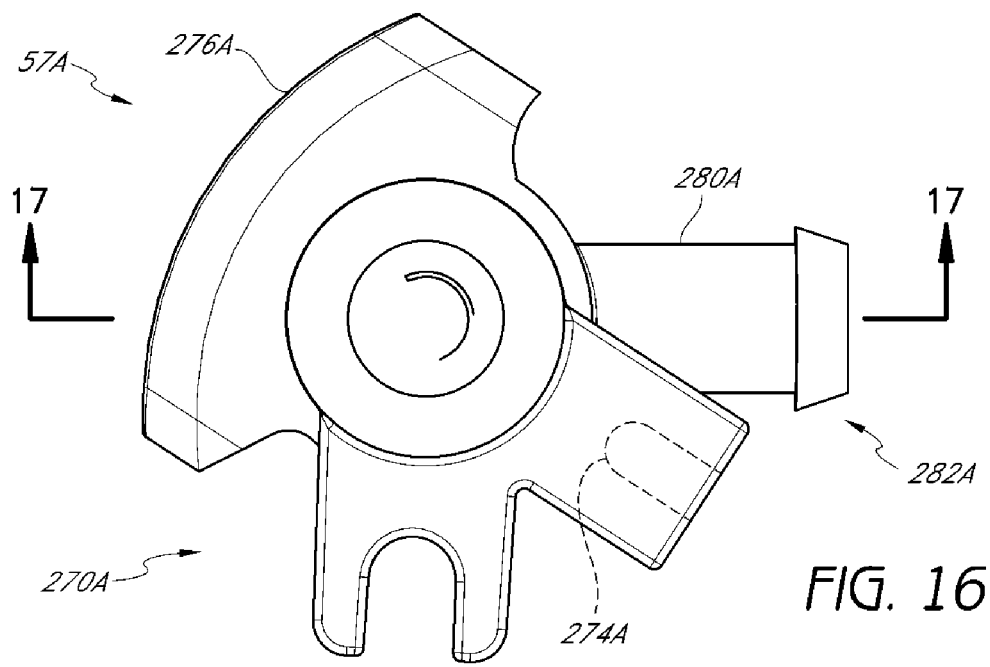
FIG. 16 is a top plan view of another soap outlet assembly that can be used with the liquid soap dispenser of FIGS. 1-12.
Figure 17:
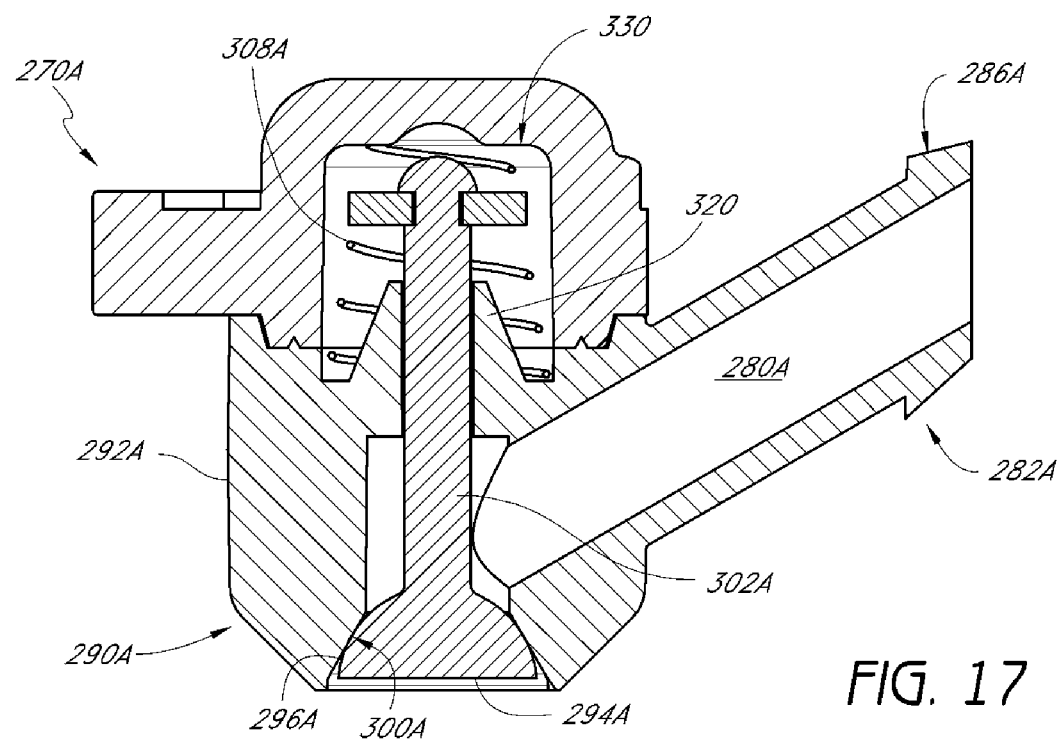
FIG. 17 is sectional view of the soap outlet assembly, taken along line 17.-17. of FIG. 16, with a valve in a closed position.
Figure 18:
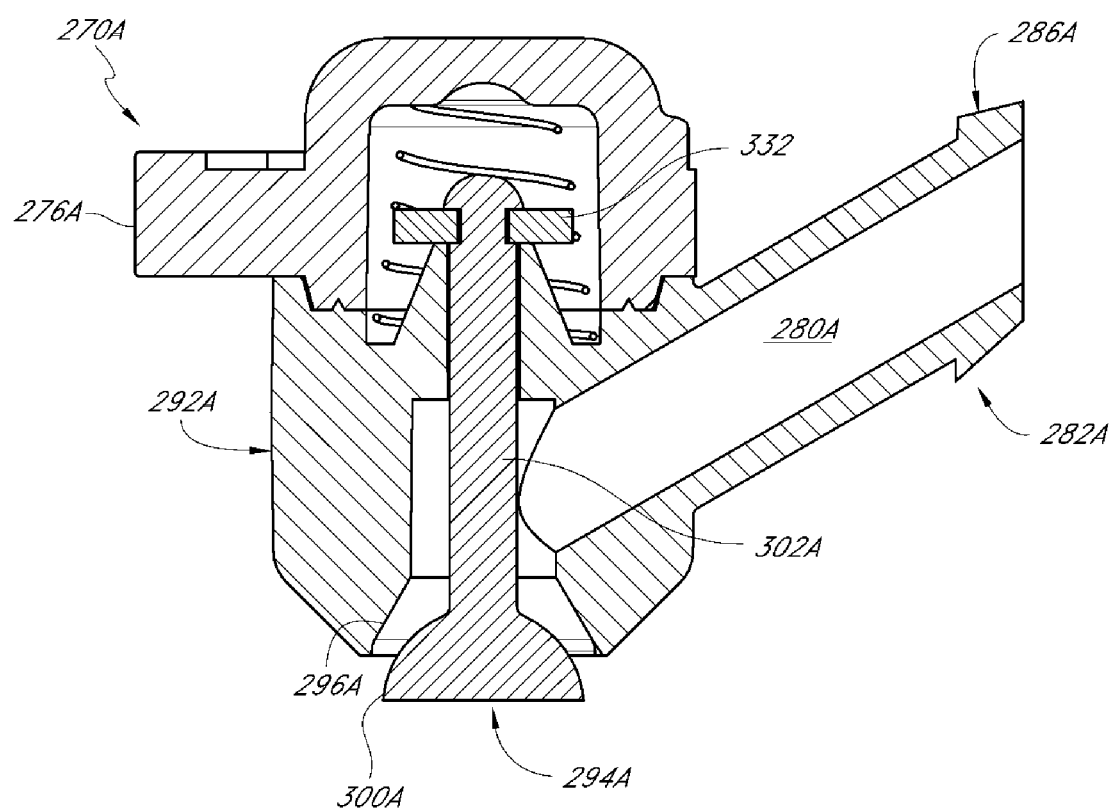
FIG. 18 is another sectional view of the soap outlet assembly, taken along line 17.-17. of FIG. 13, with the valve in a closed position.

For example, FIGS. 16-18 illustrate a modification of the light guide member 270 and the valve 290, identified generally by the reference numerals 270A, 290A, respectively. Components of the light guide member 270A and valve 290A that can be similar or the same as corresponding components of the light guide member 270 and valve 290 are identified below by the same reference numeral except that a "A" has been added thereto. Thus, a detailed description of those components is not repeated below.

With reference to FIGS. 16 and 17, in some embodiments, the fluid passage 280A can be connected directly to the valve body 292A. In some embodiments, the fluid passage 280A can be formed monolithically with the valve body 292.

As noted above, additional advantages can be achieved where the spring 308A and/or other components for guiding movement of the valve body 294A are not disposed in the path through which the liquid soap flows out of the valve 290A. For example, as illustrated in FIG. 17, the spring 308A is mounted in a separate chamber formed by a portion of the valve body 292 and a portion of the light guide member 270A. In these embodiments, the valve body 292A can include a valve stem guide 320 that forms a sliding seal with the stem 302A of the valve body 294A. As such, the valve body 294A can move in a reciprocating motion in a manner such that the stem 302A can move back and forth through the valve stem guide 320 while maintaining a seal.

In the illustrated embodiment, the light guide member 270A can include a chamber 330 that retains the spring 308A and allows a portion of the stem 302A to move reciprocally therein.

With reference to FIG. 18, in some embodiments, the valve stem 302A can include a limiter 332 configured to engage an annular recess disposed on an upper end of the valve stem 302A. With the retainer 332 connected to the upper end of the stem 302A, the valve body 294A can move between the closed position illustrated in FIG. 17 and the open position illustrated in FIG. 18 without falling out of the valve body 292A.

Figure 19:
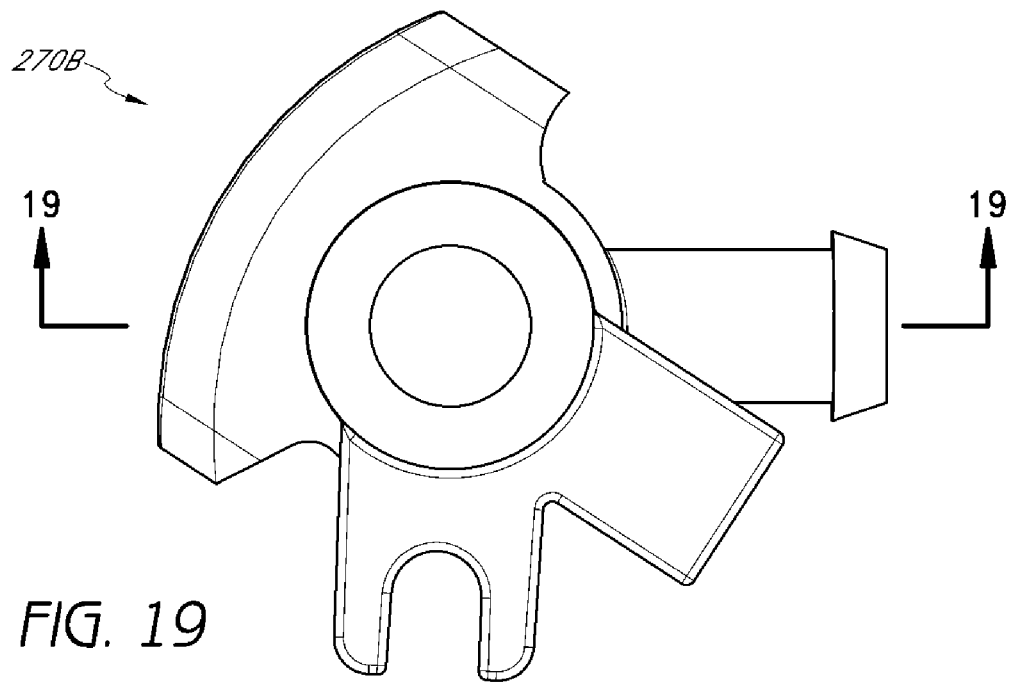
FIG. 19 is a top plan view of yet another a soap outlet assembly that can be used with the liquid soap dispenser of FIGS. 1-12.
Figure 20:
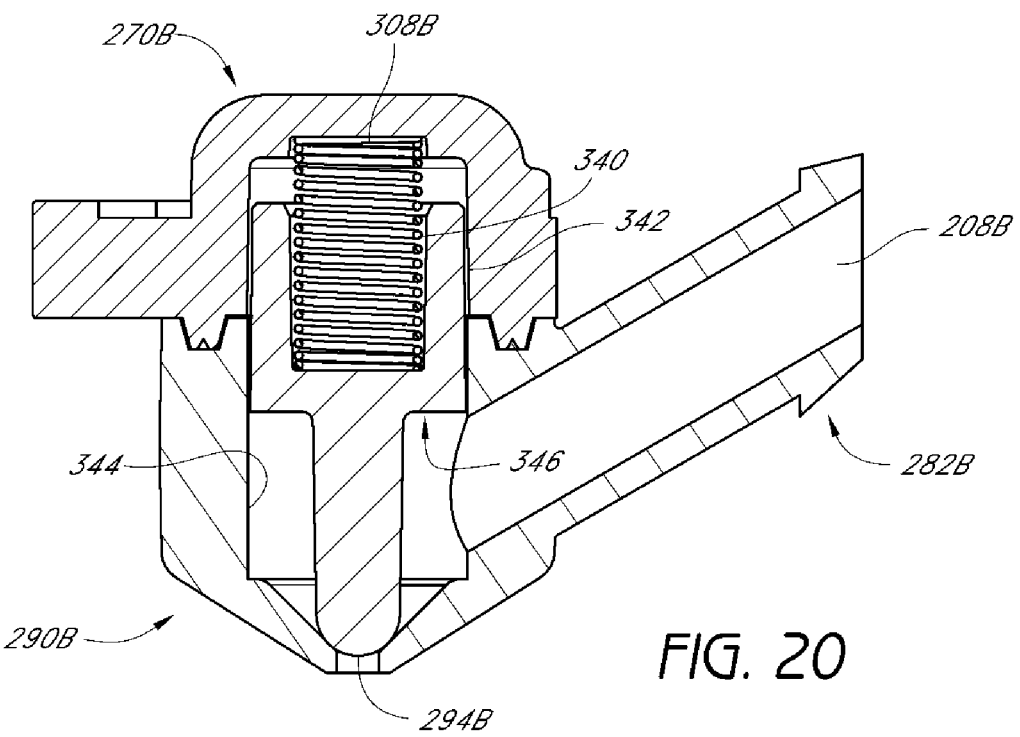
FIG. 20 is sectional view of the soap outlet assembly, taken along line 19.-19. of FIG. 19, with a valve in a closed position.
Figure 21:
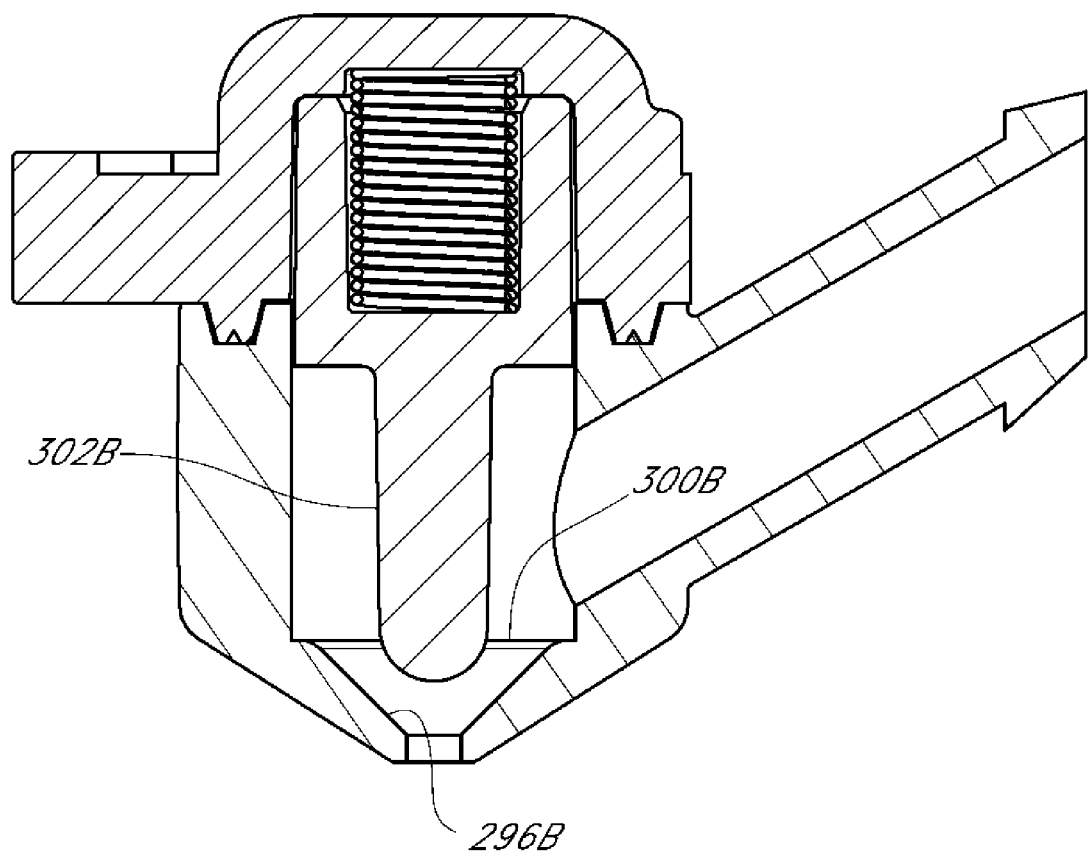
FIG. 21 is another sectional view of the soap outlet assembly, taken along line 19.-19. of FIG. 19, with the valve in a closed position.

FIGS. 19-21 illustrate another modification of the light guide 270 and valve 290, identified generally the reference numerals 270B, 290B. The components of the light guide member 270B and valve 290B that are the same are similar to those corresponding components described above with reference to FIGS. 13-18 are identified with the same reference numerals. Thus, a description of those components is not repeated below.

As shown in FIG. 20, the valve body 294B includes a cylindrical recess 340 configured to receive the spring 308B. The outer cylindrical surface 342 of the valve body 294B is configured to form a sliding sealing surface within an inner cylindrical bore 344 of the valve body 290B. In this configuration, when the pressure of liquid soap moving through the passage 280B, the pressure of the liquid soap presses on a lower facing surface 346 of the valve body 294B to thereby push the valve body 294B upwards, against the bias of the spring 308B, and toward the open position illustrated in FIG. 21. This design provides an enhanced seal partly because the size of the wetted surfaces is greatly reduced.

For example, with reference to FIG. 17, the lower end of the valve body 294A can become completely wetted with liquid soap as liquid soap is discharged through the valve 290A. Because this wetted surface is larger, drips of liquid soap can accumulate on the lower face of the valve body 294A and then inadvertently drip off after the pump 18A has stopped working.

However, comparing the shape of the valve body 294A of FIG. 17 and the valve body 294B of FIG. 20, the size of the wetted surfaces when the valve 290B is in the closed position is much smaller than that compared to that illustrated in FIG.

17. As such, the cross sectional dimension of portions of the valve face 300B are smaller than a cross sectional dimension of the valve stem. Thus, the valve 290B provides a better anti-drip functionality.

Although this invention has been disclosed in the context of a certain preferred embodiment and examples, it will be understood by those skilled in the art that the present invention extends beyond the specifically disclosed embodiment to other alternative embodiments and/or uses of the invention and obvious modifications and equivalents thereof In addition, while several variations of the invention have been shown and described in detail, other modifications, which are within the scope of this invention, will be readily apparent to those of skill in the art based upon this disclosure. It is also contemplated that various combination or sub-combinations of the specific features and aspects of the embodiments or variations may be made and still fall within the scope of the invention. It should be understood that various features and aspects of the disclosed embodiment can be combined with or substituted for one another in order to form varying modes of the disclosed invention. Thus, it is intended that the scope of the present invention herein-disclosed should not be limited by the particular disclosed embodiments described above, but should be determined only by a fair reading of the claims that follow.

What is claimed is:

1. A battery-powered electric hand soap dispenser comprising:
    a housing;
    at least one battery supported by the housing;
    a reservoir configured to store liquid soap, the reservoir having an outlet on a bottom surface thereof, the reservoir being supported by the housing;
    a pump disposed in the housing and disposed below the reservoir, the pump having an inlet connected to the outlet of the reservoir;
    an electric motor supported by the housing and driving the pump, the electric motor being powered by the battery;
    a soap outlet assembly connected to the pump with a soap conduit and disposed in an upper portion of the housing, the soap outlet assembly comprising a light guide member including a light source mounting portion configured to receive a light, and a light discharge portion defining a portion of an outer surface of the housing, the light guide member configured to guide light from the light source to the light discharge portion, the soap outlet assembly further comprising a valve configured to open when the pump is operating and biased by a spring toward a closed position such that the valve closes when the pump is not operating to prevent liquid soap from dripping out of the soap outlet assembly when the pump is not operating, the spring being positioned such that it is not within a flow of liquid soap through the soap outlet assembly when the valve is open;
    a trigger sensor configured to detect the presence of an object;
    an electronic control unit connected to the trigger sensor and to the electric motor, the electronic control unit configured to actuate the electric motor upon receiving a signal from the trigger sensor, until an amount of liquid soap has been ejected from the nozzle;
    an indicator device configured to produce a blinking light, the electronic control unit being configured to cause the indicator to generate the blinking light for a first predetermined time period after liquid soap has been ejected from the nozzle;
    a sensor configured to detect a state of the battery, the electronic control unit configured to apply less than the total amount of power available from the battery when the battery is fully charged and to apply the total amount of power available from the battery when the battery is less than fully charged;
    wherein in the electronic control unit is configured to dispense an amount of liquid soap only after a second predetermined time period has elapsed from a previous ejection of liquid soap;
    a gasket extending around the periphery of an opening in a bottom portion of the housing, the gasket extending downwardly from the lowermost portion of the housing so as to form a foot supporting the housing;
    a battery compartment defined in the housing and including a battery compartment opening in a portion of the gasket;
    a battery compartment cover engaged with the housing and covering the battery compartment opening, the battery compartment cover engaging with an aperture defined in the gasket so as to form a seal around the battery compartment opening;
    the housing defining a motor and pump compartment, the motor and the pump being disposed within the motor and pump compartment, the gasket extending around a motor and pump compartment opening in a lower portion of the motor and pump compartment;
    a motor and pump compartment cover engaged with the housing and forming a seal with the portion of the gasket extending around the motor and pump compartment opening;
    wherein the electronic control unit is configured to actuate the motor so as to drive the pump so as to dispense liquid soap in predetermined amounts;
    wherein the electronic control unit is configured to activate the trigger sensor at the end of each third predetermined time period for an amount of time that is less than the third predetermined time period;
    wherein the electronic control unit is configured to cyclically operate the motor in forward and reverse directions in order to clear a clog in the nozzle when a button is depressed in accordance with a first predetermined pattern;
    wherein the electronic control unit is configured to activate or deactivate the indicator when the button has been depressed in accordance with a second predetermined pattern; and
    a soap volume adjustment device configured to allow a user to select different amounts of soup to be discharged, the electronic control unit is configured to vary the amount of soap discharged based on a state of the soap volume adjustment device.

2. An electric soap dispenser comprising:
    a housing;
    a power supply;
    a reservoir configured to store liquid soap;
    a pump having an inlet in fluid communication with an outlet of the reservoir;
    an electric motor adapted to drive the pump;
    a soap outlet in fluid communication with
    a trigger sensor configured to detect the presence of an object;
    an electronic control unit electrically connected to the trigger sensor and to the electric motor, the electronic control unit configured to actuate the electric motor upon receiving a signal from the trigger sensor; and a valve comprising a valve face and a valve seat, the valve face and the valve seat forming an interface when the valve is closed, the interface comprising a curved, tapering surface.

3. The soap dispenser according to claim 2 additionally comprising a soap outlet assembly comprising a soap inlet, the soap outlet, and the valve.

4. The soap dispenser according to claim 3, wherein the soap outlet assembly further comprises a light guide member and a light source configured to emit light into the light guide member, the light guide member comprising a light discharge portion defining a portion of an outer surface of the housing.

5. The soap dispenser according to claim 4, wherein a portion of the light guide member defines a portion of a liquid soap passage defined in the soap outlet assembly.

6. The soap dispenser according to claim 2, wherein at least a portion of one of the valve face and valve seat comprises a hemispherical surface and the other of the valve face and valve seat comprises a conical surface.

7. The soap dispenser according to claim 2, wherein the biasing member comprises a spring.

8. The soap dispenser according to claim 2 additionally comprising a light guide member connected to the valve and including a recess configured to receive at least a portion of the biasing member.

9. The soap dispenser according to claim 2 wherein an inner surface of the soap outlet defines the valve seat, the valve further comprising a valve stem, the valve face being configured to form a seal with the valve seat, the valve stem defining a first cross sectional dimension and a portion of the valve face configured to seal against the valve seat having a second cross sectional dimension that is smaller than the first cross sectional dimension.

10. An electric soap dispenser comprising:
a housing;
a power supply;
a reservoir configured to store liquid soap;
a pump having an inlet connected to the outlet of the reservoir;
an electric motor supported by the housing and driving the pump, the electric motor adapted to be powered by the power supply;
an electronic control unit connected to the electric motor, the electronic control unit configured to actuate the electric motor; and
a soap outlet assembly connected to the pump, the soap outlet assembly comprising a soap outlet aperture, an indicator light guide member and an indicator light source, the indicator light guide member being configured to guide visible light from the indicator light source to a portion of the light guide member forming part of an exterior of the housing, the indicator light guide member further comprising a fluid passageway having an inlet connected to a conduit of the pump, the indicator light source configured to heat soap in the fluid passageway.

11. The soap dispenser according to claim 10, wherein the soap outlet assembly comprises a liquid soap passage.

12. The soap dispenser according to claim 11, wherein the liquid soap passage is formed monolithically with the light guide member.

13. The soap dispenser according to claim 11, wherein the light guide member further comprises a light source receiving portion configured to receive the light source, the liquid soap passage being formed monolithically with the light source receiving portion.

14. The soap dispenser according to claim 10, wherein the soap outlet assembly is formed as an integral unit.

15. The soap dispenser according to claim 10, further comprising a trigger sensor configured to detect the presence of an object.

16. The soap dispenser according to claim 2, wherein the biasing member is located in a separate chamber located outside the flow of liquid soap.

17. The soap dispenser according to claim 16, wherein the valve comprises a valve stem, and wherein the soap dispenser further comprises a valve stem guide, at least a portion of the valve stem positioned within the valve stem guide to form a seal between the chamber and the valve face.

18. The soap dispenser according to claim 2, wherein the interface forms a single line of contact between the valve face and the valve seat.

* * * * *

UNITED STATES PATENT AND TRADEMARK OFFICE
CERTIFICATE OF CORRECTION

| | | |
|---|---|---|
| PATENT NO. | : 8,109,411 B2 | Page 1 of 1 |
| APPLICATION NO. | : 11/839426 | |
| DATED | : February 7, 2012 | |
| INVENTOR(S) | : Frank Yang et al. | |

It is certified that error appears in the above-identified patent and that said Letters Patent is hereby corrected as shown below:

In Column 4, Line 16, change "lest" to --least--.

In Column 5, Line 31, change "14.14." to --14.14--.

In Column 5, Line 33, change "14.14." to --14.14--.

In Column 5, Line 38, change "17.17." to --17.17--.

In Column 5, Line 40, change "17.17." to --17.17--.

In Column 5, Line 46, change "19.19." to --19.19--.

In Column 5, Line 48, change "19.19." to --19.19--.

In Column 6, Line 10, change "an" to --can--.

In Column 8, Line 58, change "thereof" to --thereof.--.

In Column 21, Line 10, change "thereof" to --thereof.--.

In Column 22, Line 7, in Claim 1, after "wherein" delete "in".

In Column 22, Line 50, in Claim 1, change "soup" to --soap--.

In Column 22, Line 61, in Claim 2, change "with" to --with the pump;--.

Signed and Sealed this
Eighth Day of January, 2013

David J. Kappos
*Director of the United States Patent and Trademark Office*